United States Patent [19]
Schroeder et al.

[11] Patent Number: 5,842,603
[45] Date of Patent: Dec. 1, 1998

[54] POSTMIX JUICE DISPENSER

[75] Inventors: Alfred A. Schroeder; Michael T. Romanyszyn, Jr., both of San Antonio; Craig Cloud, New Braunfels, all of Tex.

[73] Assignee: The Coca-Cola Company, Atlanta, Ga.

[21] Appl. No.: 444,164

[22] Filed: May 18, 1995

Related U.S. Application Data

[60] Continuation-in-part of Ser. No. 178,721, Jan. 10, 1994, Pat. No. 5,494,193, which is a division of Ser. No. 843,757, Feb. 28, 1992, Pat. No. 5,305,923, which is a continuation of Ser. No. 752,406, Aug. 30, 1991, abandoned, which is a continuation-in-part of Ser. No. 634,857, Dec. 27, 1990, abandoned, which is a continuation-in-part of Ser. No. 534,601, Jun. 6, 1990, abandoned, and a continuation-in-part of Ser. No. 715,433, Jun. 14, 1991, abandoned.

[51] Int. Cl.$^6$ ........................................................ B67D 5/56
[52] U.S. Cl. .................. 222/23; 222/51; 222/57; 222/61; 222/63; 222/66; 222/71; 222/95; 222/129.1; 222/145.6; 222/146.6; 222/256; 222/258; 222/327
[58] Field of Search ................................... 222/1, 23, 25, 222/51, 52, 57, 61, 62, 63, 66, 71, 95, 105, 129.1, 129.2, 129.3, 129.4, 135, 137, 145.1, 145.6, 145.7, 146.6, 252, 256, 258, 262, 325–327, 333, 383.1–383.2, 386–387, 389–390; 418/48

[56] References Cited

U.S. PATENT DOCUMENTS

| | | |
|---|---|---|
| 1,757,367 | 5/1930 | Pritchard . |
| 1,828,317 | 10/1931 | Clapp . |
| 1,892,217 | 12/1932 | Moineau . |
| 2,028,407 | 1/1936 | Monineau . |
| 2,532,145 | 11/1950 | Byram . |
| 2,603,162 | 7/1952 | Lloyd . |
| 2,612,845 | 10/1952 | Byram et al. . |
| 2,691,347 | 10/1954 | Zimmer . |
| 2,822,152 | 2/1958 | Knudsen . |
| 2,826,152 | 3/1958 | Michie . |
| 3,459,337 | 8/1969 | Williamson . |
| 3,528,587 | 9/1970 | Popinski . |
| 3,529,749 | 9/1970 | Lehmann et al. . |
| 3,688,947 | 9/1972 | Reichenberger . |
| 4,096,971 | 6/1978 | Kückens . |
| 4,172,669 | 10/1979 | Edelbach . |
| 4,173,296 | 11/1979 | Marshall . |
| 4,194,650 | 8/1987 | Nottke et al. . |
| 4,325,682 | 4/1982 | Willis . |
| 4,515,294 | 5/1985 | Udall . |
| 4,610,145 | 9/1986 | Arzberger et al. . |
| 4,624,395 | 11/1986 | Baron . |
| 4,667,854 | 5/1987 | McDermott et al. . |
| 4,687,120 | 8/1987 | McMillin . |
| 4,703,770 | 11/1987 | Arzberger et al. . |
| 4,708,266 | 11/1987 | Rudick . |
| 4,722,372 | 2/1988 | Hoffman et al. . |
| 4,793,518 | 12/1988 | Burton . |
| 4,818,197 | 4/1989 | Mueller . |
| 4,856,676 | 8/1989 | Emody . |
| 4,860,923 | 8/1989 | Kirschner et al. . |
| 4,875,604 | 10/1989 | Czech . |
| 4,955,509 | 9/1990 | Nevill . |
| 4,979,647 | 12/1990 | Hassell . |
| 4,982,877 | 1/1991 | Burton . |
| 5,031,797 | 7/1991 | Boris et al. . |
| 5,114,047 | 5/1992 | Baron et al. . |
| 5,165,577 | 11/1992 | Ophardt . |
| 5,176,297 | 1/1993 | Mooney et al. . |
| 5,282,552 | 2/1994 | Ophardt . |
| 5,305,923 | 4/1994 | Kirschner . |
| 5,312,017 | 5/1994 | Schroeder et al. . |
| 5,494,193 | 2/1996 | Kirschner et al. ................... 222/129.1 |

FOREIGN PATENT DOCUMENTS

| | | |
|---|---|---|
| 0067466 | 12/1982 | European Pat. Off. . |
| 0736119 | 8/1955 | United Kingdom . |
| 9200761 | 11/1992 | WIPO . |

*Primary Examiner*—Andres Kashnikow
*Assistant Examiner*—Kenneth Bomberg
*Attorney, Agent, or Firm*—Thomas R. Boston

[57] ABSTRACT

A postmix juice dispenser for use with a disposable juice concentrate package that includes an integral progressive cavity pump and a mixing nozzle. The dispenser can read a product I.D. label on the package to automatically change ratios as packages are switched and a low liquid level indicator in the package to both warn the operator and to then provide automatic shut-off. A controller adjusts the pump motor speed in response to signals from a water flow meter to provide excellent control of ratio, even as water pressure changes. An easy lift-out refrigeration deck is located over an ice-water bath tank capable of holding 27 pounds of ice.

15 Claims, 19 Drawing Sheets

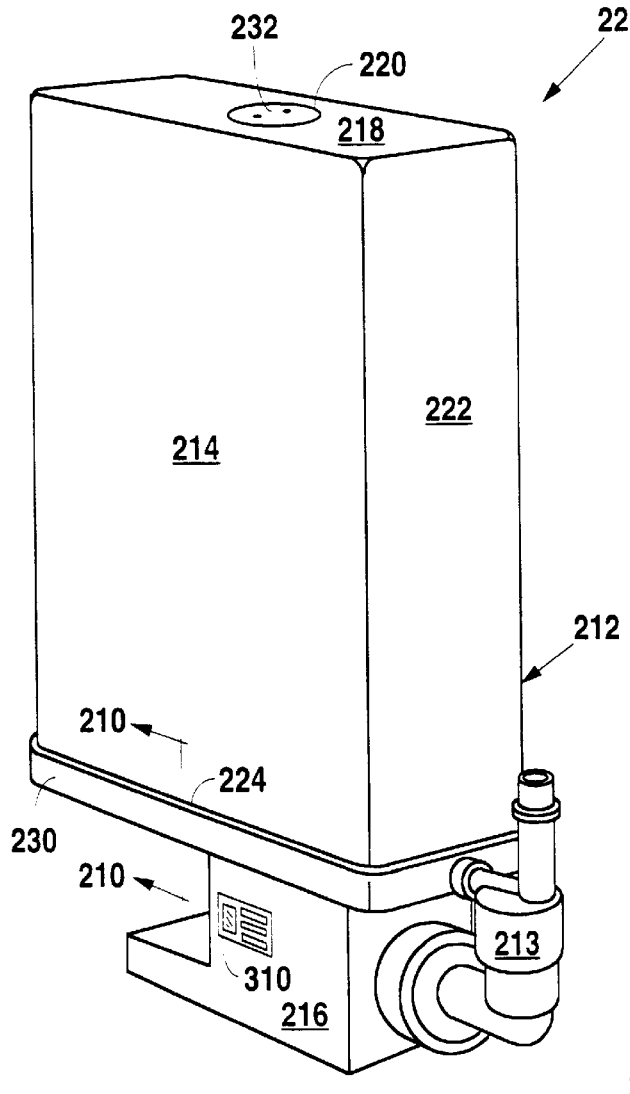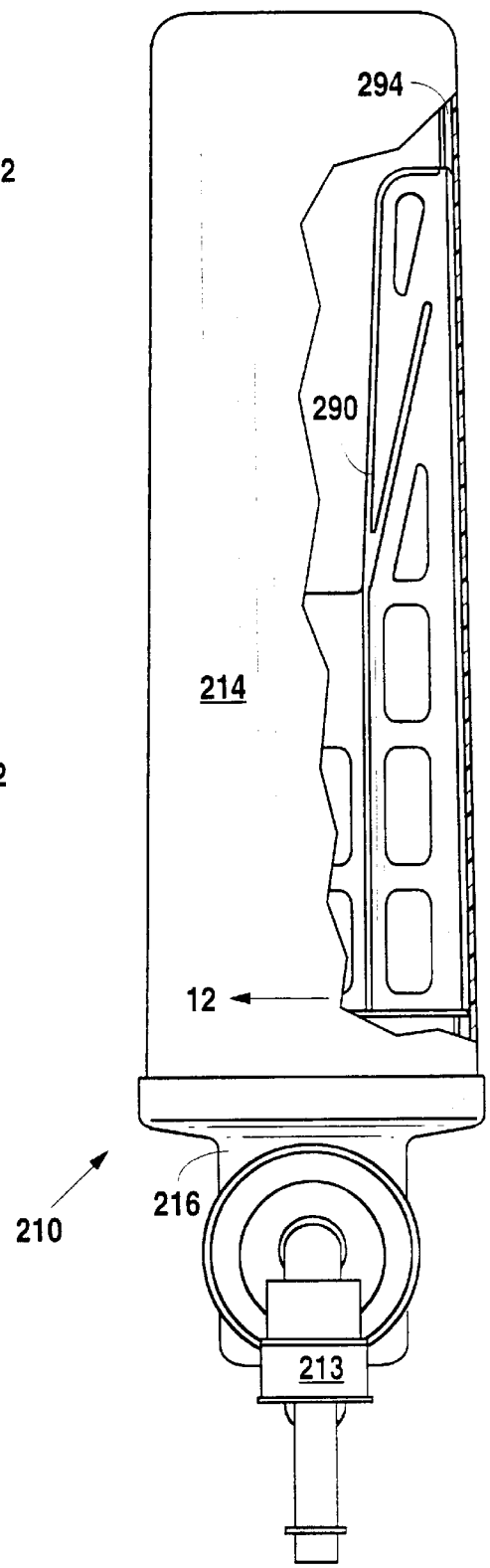
Fig. 9
Fig. 10

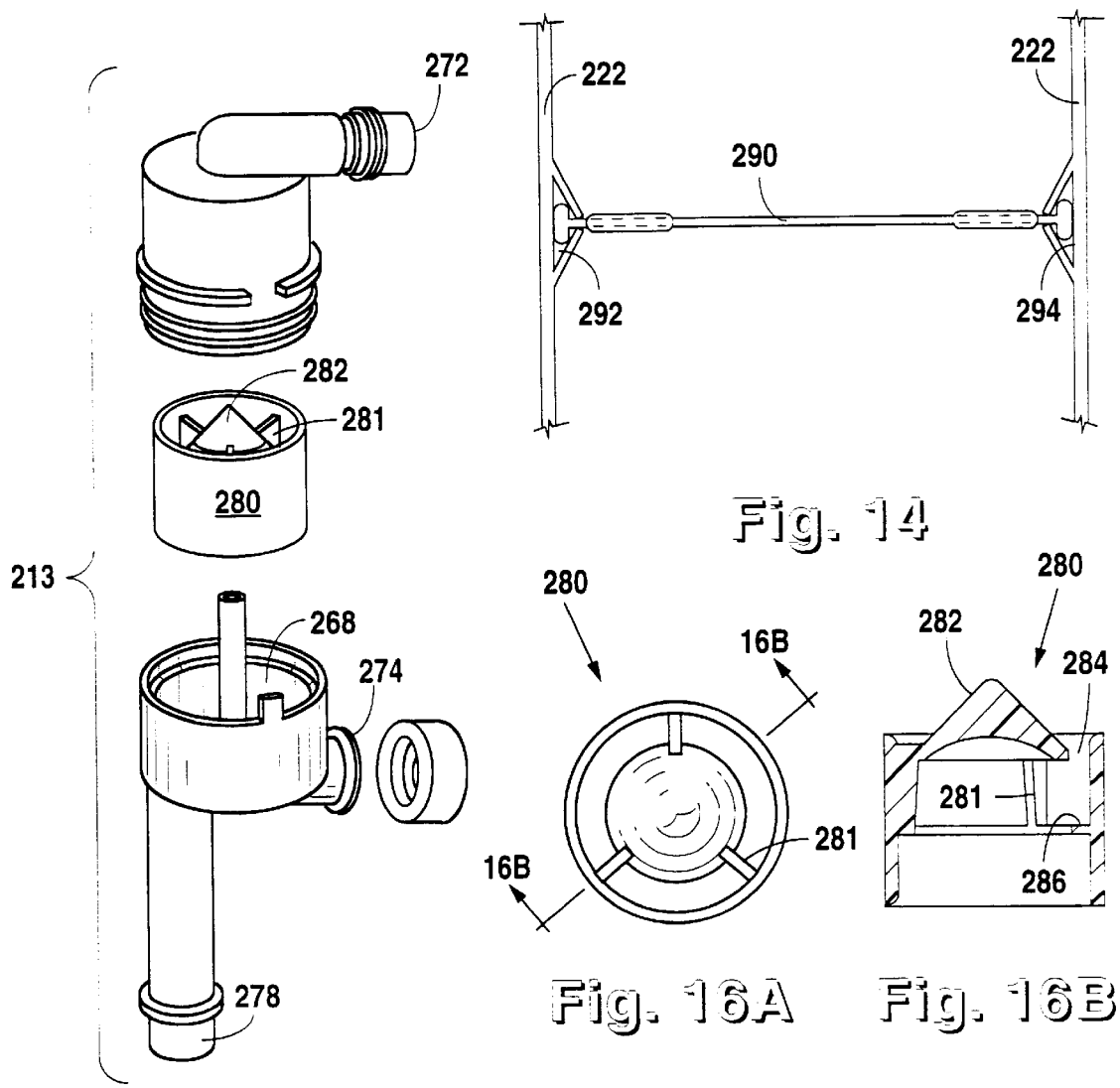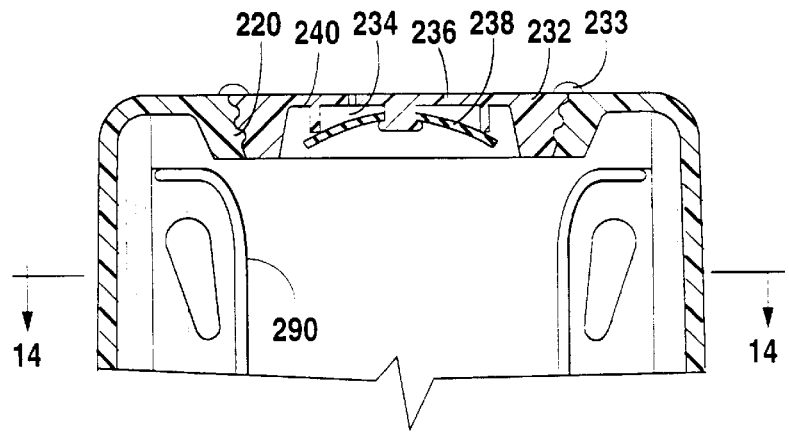

POSTMIX JUICE DISPENSER

CROSS REFERENCE TO RELATED APPLICATIONS

This is a continuation-in-part of U.S. patent application Ser. No. 08/178,721 filed Jan. 10, 1994, (now U.S. Pat. No. 5,494,193) which was a divisional of U.S. patent application Ser. No. 07/843,757 Feb. 28, 1992, (now U.S. Pat. No. 5,305,923), which was a continuation of U.S. patent application Ser. No. 07/752,406 filed Aug. 30, 1991 (now abandoned) and having the same title, which was in turn a continuation-in-part of U.S. patent application Ser. No. 07/634,857 filed Dec. 27, 1990 (now abandoned) and having the same title, which was in turn a continuation-in-part of U.S. patent application Ser. No. 07/534,601 filed Jun. 6, 1990 with the same title (now abandoned), and is also a continuation-in-part to U.S. patent application entitled "Progressive Cavity Pump" filed Jun. 14, 1991, Ser. No. 07/715,433 (now abandoned).

BACKGROUND OF THE INVENTION

This invention relates to postmix juice dispensers and in particular to one using a disposable and recyclable juice concentrate package that also includes an integral pump and mixing nozzle.

Similar dispensers and packages are known, however, they are subject to a number of disadvantages such as poor drink quality (poor brix and poor mixing), low dispensing flow rates, limited cooling capacity, and limited number of drinks per package.

SUMMARY OF THE INVENTION

A postmix juice dispenser for use with a disposable and recyclable concentrate package that includes an integral progressive cavity pump and mixing nozzle. The dispenser has a size similar to that of existing dispensers, while providing greatly increased dispensing flow rate, greatly increased number of drinks per package, excellent mixing, automatic ratio changing as packages are changed, low liquid level warning, automatic sold-out shut-off, greatly increased draw capacity at the desired temperature, carafe dispensability, ease of package insertion, continuous concentrate pumping versus batch pumping for improved mixing, lift-out refrigeration deck and easy motor replacement without tools.

The dispenser includes a housing, a lift-out refrigeration deck on top of an ice water bath tank and two front doors to access four concentrate package stations. The packages have a dispenser readable product identification (I.D.) label and a dispenser readable low liquid level indicator and the dispenser has a product I.D. reader and a level indicator reader. An electronic controller dynamically varies the concentrate pumping rate during the dispensing in response to signals from a water flow meter. The controller also responds to the information on the product I.D. label to automatically set the desired ratio of water to concentrate. The dispenser height is adjustable to provide a dispensing height sufficient to dispense into carafes.

BRIEF DESCRIPTION OF THE DRAWINGS

The present invention will be more fully understood from the detailed description below when read in connection with the accompanying drawings wherein like reference numerals refer to like elements and wherein:

FIG. 9 is a front, top, left side perspective view of the concentrate package of this invention, with the mixing nozzle turned up for shipping;

FIG. 10 is a front elevational view of the package of FIG. 9, but with the mixing nozzle rotated down for insertion into a dispenser;

FIG. 14 is a cross-sectional view along line 14—14 of FIG. 15 showing the stiffening rib;

FIG. 15 is a cross-sectional view along line 15—15 of FIG. 11 showing the fill cap and air vent valve thereof;

FIG. 16 is an exploded perspective view of the mixing nozzle;

FIG. 16A is a top view of the mixing element 280;

FIG. 16B is a cross-sectional view through the mixing element 280 taken along line 16B—16B of FIG. 16A;

DETAILED DESCRIPTION OF THE PREFERRED EMBODIMENT

Figure 1:
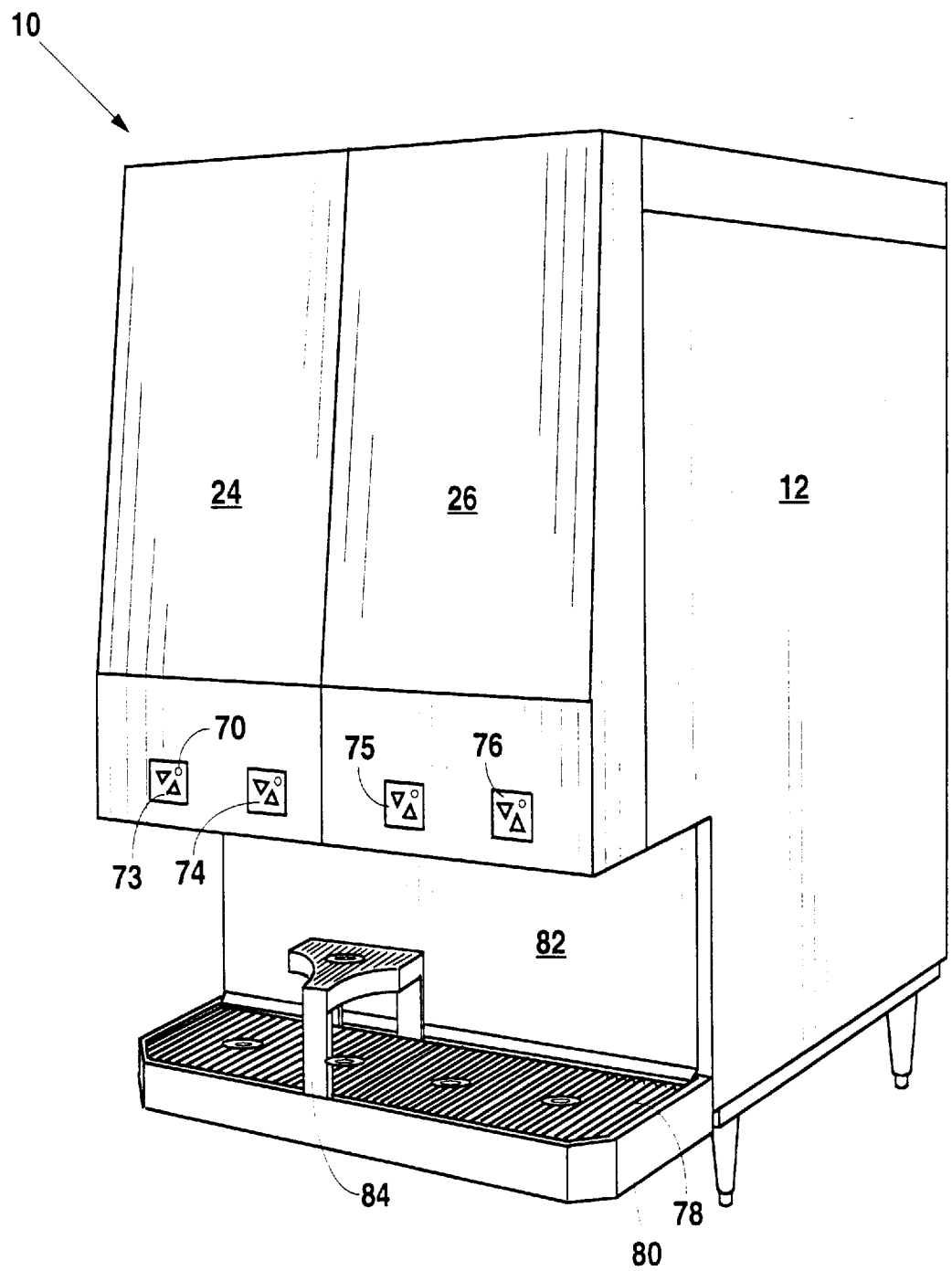
FIG. 1 is a front, right side perspective view of the dispenser of the present invention.
Figure 2:
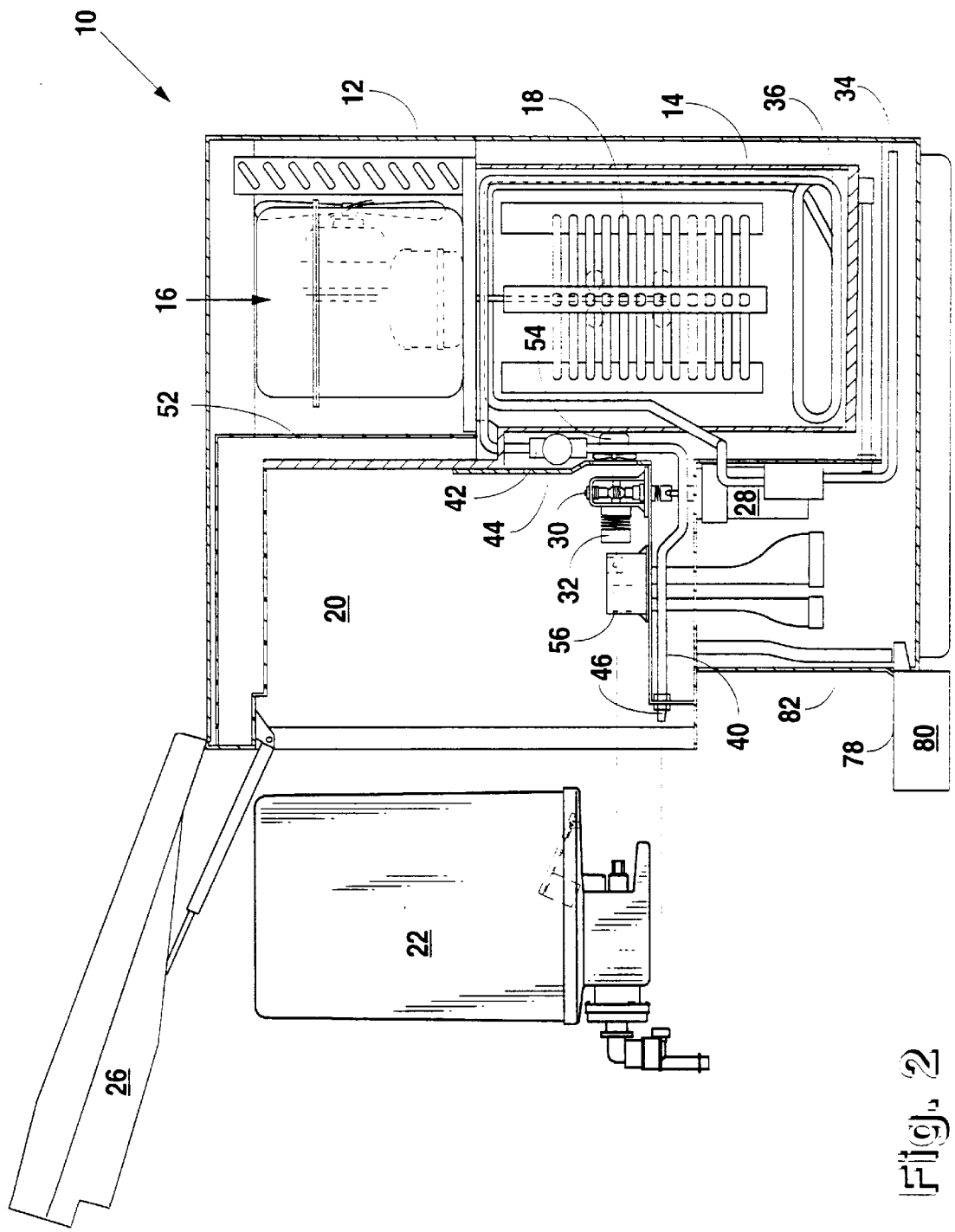
FIG. 2 is a side cross-sectional view of FIG. 3.
Figure 3:
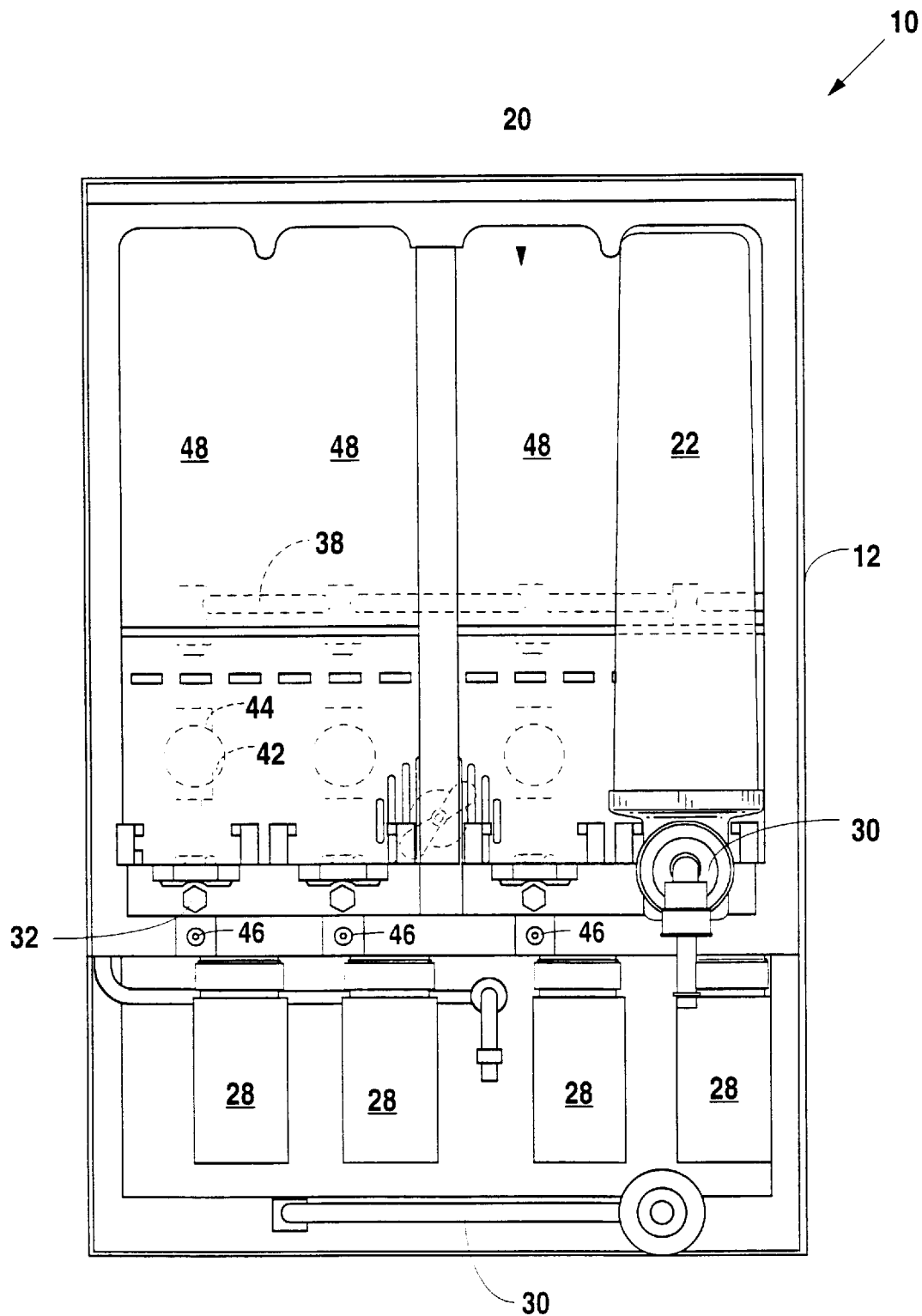
FIG. 3 is a front cross-sectional view of FIG. 2.
Figure 4:
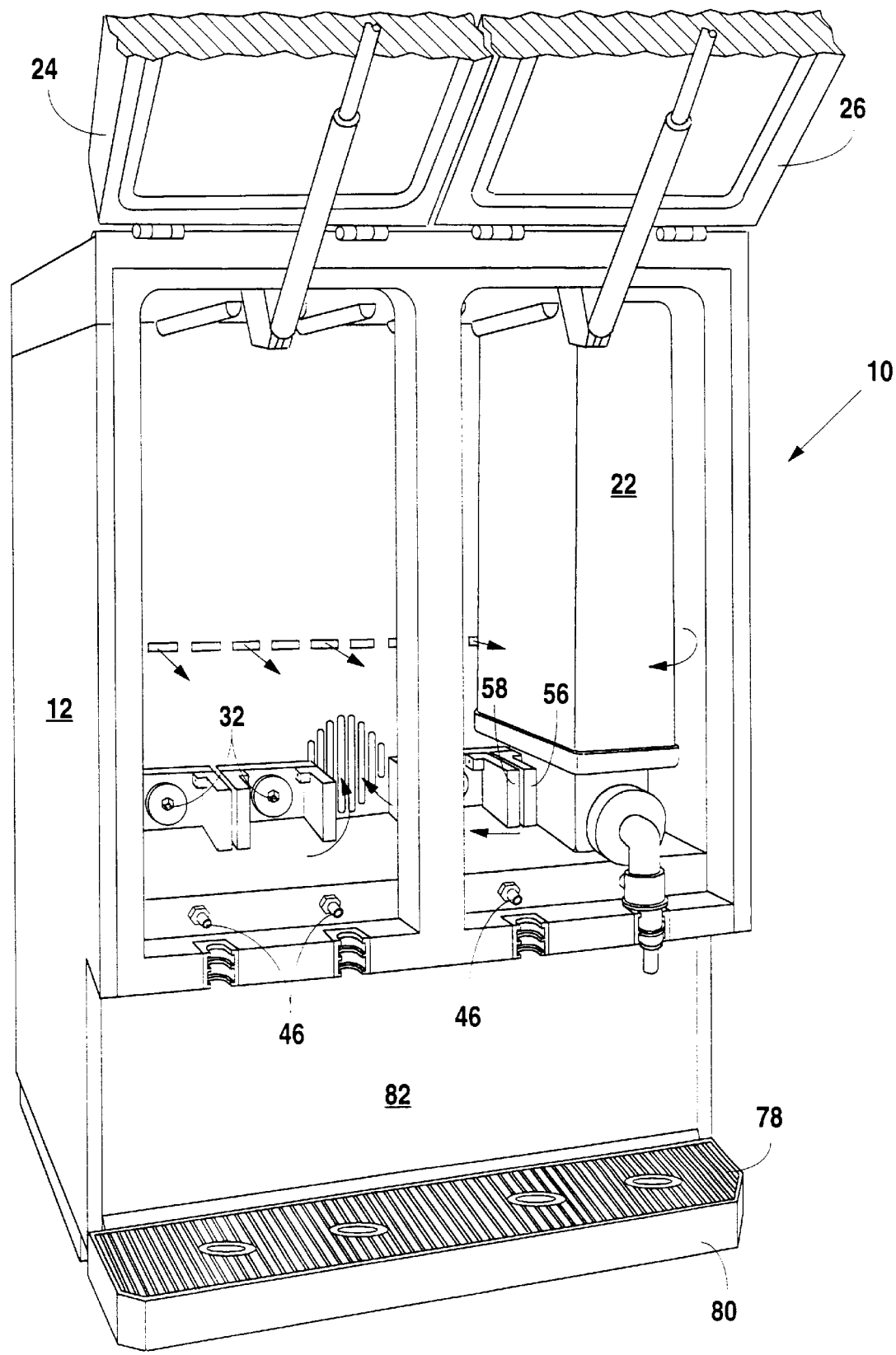
FIG. 4 is a front, left side perspective view with the doors open.

With reference now to the drawings, FIGS. 1–8 show a postmix juice dispenser 10 according to the present invention. The dispenser 10 includes a housing 12, an ice-water bath tank 14, a refrigeration system 16 including an evaporator coil 18 in the tank 14, a package chamber 20 for receiving four juice concentrate packages 22 and a pair of doors 24 and 26 providing access to the chamber 20.

The dispenser 10 includes four motors 28, each connected through a 90° gear 30 to a drive shaft coupling 32. This arrangement moves the motors from behind the package to below it, to allow the tank 14 to be located as shown and directly below the refrigeration system 16.

The dispenser 10 includes a water inlet line 34, plumbed to the local water supply, connected in turn to a cooling coil 36 located in the tank 14, which in turn is connected to a water manifold 38. A water supply line 40 extends from the manifold 38 through a solenoid 42 and a water flow meter 44 to a connector nipple 46 in a package receiving station 48. The solenoid and water flow meter are preferably identical to that described in U.S. Pat. No. 5,381,926.

An electronic controller 50 receives signals from the flow meter 44 regarding the water flow rate (and thus the volume of water passing therethrough) and in turn controls the speed of the respective motor 28 to obtain the desired ratio of water to concentrate.

Each of the four package stations 48 in the chamber 20 has one drive shaft coupling 32 and one water supply nipple 46.

The tank 14 is made of aluminum and the chamber 20 has at least one aluminum wall 52 connected directly to a wall of the tank, to keep the chamber 20 cold. In addition, a small motor and fan unit 54 circulates the air in the chamber 20 to help keep the packages 22 cold.

The packages 22 will now be described with reference to FIGS. 9 to 18. FIGS. 9–18 show the concentrate package 22 including a package housing 212 and a mixing nozzle 213. The package housing 212 includes an upper juice concentrate container housing 214 and a lower pump housing 216.

The container housing 214 includes an upper wall 218 having a fill opening 220, and a sidewall 222 having a lower peripheral connecting edge 224 surrounding a container housing bottom opening 226.

The pump housing 216 encloses a pumping chamber 228 and has an upper peripheral attaching edge 230 that mates in a liquid-tight sealing connection with said connecting edge 224.

A fill plug 232 is fitted into said fill opening in a liquid-tight sealing fit. The fill plug can be snap-fit alone or preferably can also be induction welded, spin welded, or sonically welded, as at 233, in place. The fill plug includes a one-way air vent valve 234 that prevents egress of liquid but allows air to enter the package as concentrate is pumped out causing reduced air pressure therein. This prevents the package from collapsing. The valve 234 includes a plurality of holes 236, a flexible diaphragm 238 and an annular valve seat 240.

Figure 18:
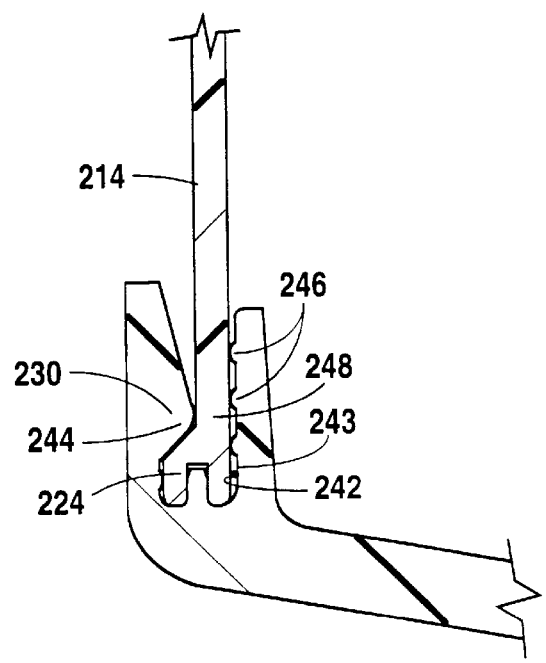
FIG. 18 is an enlarged cross-sectional view through the housings connection.
Figure 17:
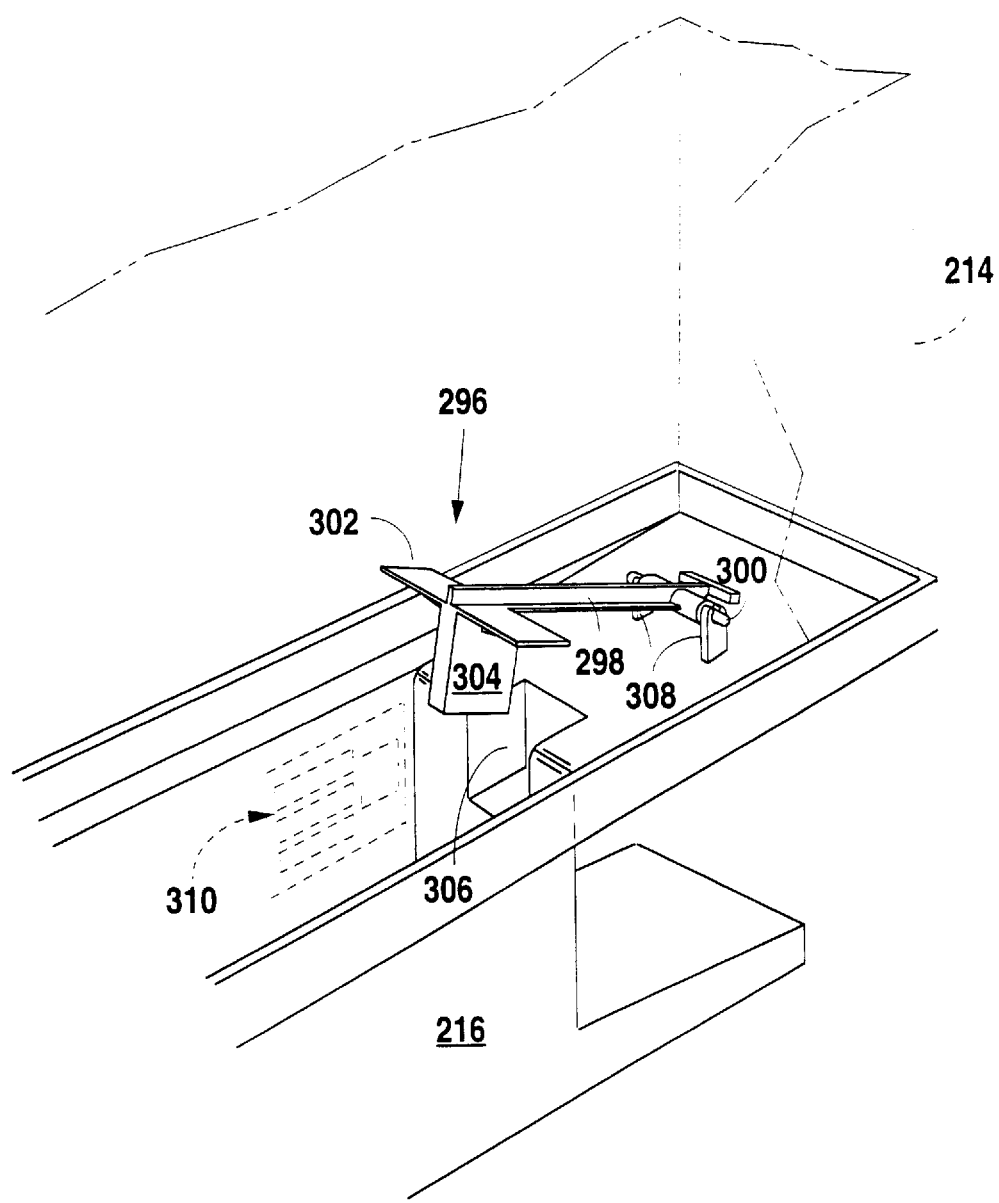
FIG. 17 is a partial perspective view showing the flag.

Referring to FIG. 18, the attaching edge 230 includes a peripheral groove 242, a locking bead 244 and a plurality of sealing beads 246. The connecting edge 224 includes a peripheral tongue 248 that matingly fits in said groove 242 with a liquid-tight seal. A bead 243 of sealant is preferably located in the groove 242 to assist in making a liquid-tight seal.

A progressive cavity pump 250 (or moineau pump) is located in the pump chamber 228 in the pump housing 216. The pump 250 includes a rotor 254 and a stator 256. The stator includes a flexible bellows 258 at its distal end to allow the stator to move radially. A stop 260 abuts the proximal end of the stator to prevent axial movement thereof. The rotor 254 includes a drive shaft 262 extending exteriorly of the pump housing for connection to the coupling 32 through a liquid-tight seal 264. The pump housing includes a concentrate outlet opening 265.

The mixing nozzle 213 includes a nozzle housing 266 rotatably connected to the pump housing 216 and enclosing a mixing chamber 268, a concentrate passageway 270 leading from a concentrate inlet opening 272 to a concentrate inlet port 273 into said mixing chamber, a water inlet opening 274, a water passageway leading from said water inlet opening 274 into said mixing chamber, and a beverage discharge spout 278. The mixing chamber 268 includes a mixing element 280 which is also a shut-off valve. The mixing aspect of element 280 operates as follows: the incoming concentrate from the pump is forced to spread out around the conical surface 282 and enter the mixing chamber through the narrow annular slot 284 where it is hit and sheared by water which is directed against the concave bottom of the element 280 and then spreads out toward the slot 284 where it violently hits and mixes with the concentrate. Preferably, a flange 286 extends radially into the chamber 268 below the slot tb further agitate and mix the water and concentrate. This violent action fully mixes the two components and no unmixed solids (such as occur in orange juice with pulp) are found in the bottom of a dispensed cup of beverage. The element 280 is preferably made of air-foamed polyethylene to increase its buoyancy. The flanges 281 are preferably at an angle so that the water hitting the concave undersurface of the element 280 causes it to rotate. This dynamic movement of the element 280 further assists the dynamic mixing.

The valve aspect of the mixing element 280 is that it floats in the single strength juice in the mixing chamber when the dispenser is off, and seals against a valve seat 288 to prevent any concentrate from flowing into the mixing chamber. When a drink is to be dispensed, the element 280 is pushed down by the flow of concentrate from the pump, thus opening the valve.

The container housing is rectangular in horizontal cross-section with two long side walls and two short side walls. The container housing tends to bulge outwardly in the middle due to the weight of the juice concentrate and the thinness of the housing walls. It is preferred to include a stiffening rib 290 inside the housing 214 to prevent such bulging. The rib 290 is a separate member that is slid into a pair of grooves 292 and 294 that are preferably molded in place on the inside side walls of the long walls of the housing 214. The rib 290 can be welded in place or preferably held by a locking bead on the rib. One or more such ribs can be used, as desired. The upper portion of the rib 90, below the fill opening 20, does not extend all the way across the package, so as to avoid interfering with a fill tube; the rib 90 does extend all the way across the package toward the lower portion of the package.

An important aspect of the package of this invention is the inclusion of a low level indicator 295, so that the operator will know when the package is low and so the dispenser will know when it is empty, and for preventing further dispensing when it is empty. These features are accomplished by means of a movable float 296. The preferred float 296 is hingedly connected at one end thereof to the housing 212 and the other end is free to move (float) between an upper position, when the liquid level is at or above the float, and a lower position as the liquid level falls below the upper position. The float 296 includes an elongated arm 298, a hinge pin 200, a wing 202 for floating on the liquid surface, and a flag 204 that descends into a narrow pocket 206 as the float falls to its lowermost position. The flag is preferably formed with white pigment to increase its opacity to infrared radiation and is preferably about ⅜" thick. The float is preferably air-foamed polyethylene to increase its buoyancy. The dispenser will have an infrared transmitter and receiver on opposite sides of said trough to detect said flag. The flag is preferably attached to the hinge posts 208 on the top wall of the pump-housing 216 prior to the housings 214 and 216 being connected together.

The package 22 preferably includes a product identification label 110 on the left side of the pump housing as shown in FIG. 1. It preferably includes a shiny surface with a series of one, two or three black lines.

The mixing nozzle 213 preferably can rotate about its connection to the package housing 212 so that the nozzle 213 can be rotated up during shipping and handling, to take up less room and prevent damage thereto, and can be rotated down just prior to insertion into a dispenser.

The package 22 preferably includes tamper evidence means such as a shrink wrap around the package. The housings are preferably injected molded of polyethylene.

Returning now to the dispenser 10, the dispenser also includes, at each of the stations 48 in the chamber 20, a pair of housings 56 and 58 on opposite sides of the package for mounting a product I.D. reader 60 and a liquid level reader 62. The product I.D. reader 60 is mounted only in the left housing 58 and includes three light transmitter-receiving pairs 64. These detect the existence of bars on the product I.D. label. Different products (or products having different water-concentrate ratios) can thus be identified by the dispenser automatically, without any action by the operator, and a perfect drink can be dispensed automatically. The liquid level reader 62 includes an infrared transmitter 66 in one housing 58 and an infrared receiver 68 in the other housing 56 and on opposite sides of the pocket 106 of the package. When the liquid level is above the float, a signal is generated by the reader 62. But as the liquid level falls, the flag 104 falls and eventually interrupts the signal. The controller 50 then starts a low light 70 on the door 24 flashing slowly; as the pump turns the light flashes more frequently. When a certain number of pump turns (as counted by encoder 72) has elapsed, the controller 50 will not allow the pump to be energized and the light 70 will be continuously on.

When the product I.D. reader 60 sees the label, it starts the pump turning slowly to help engage the coupling 32 with the drive shaft 62 of the package 22. The power sent to the motor is not sufficient to turn the progressive cavity pump.

The controller 50 controls the motor speed both in response to signals from the flow meter and from the product I.D. reader. The product I.D. will set the ratio, and the motor will then change speed only when and if the water flow meter indicates a change in the water volume per unit of time.

Figure 5:
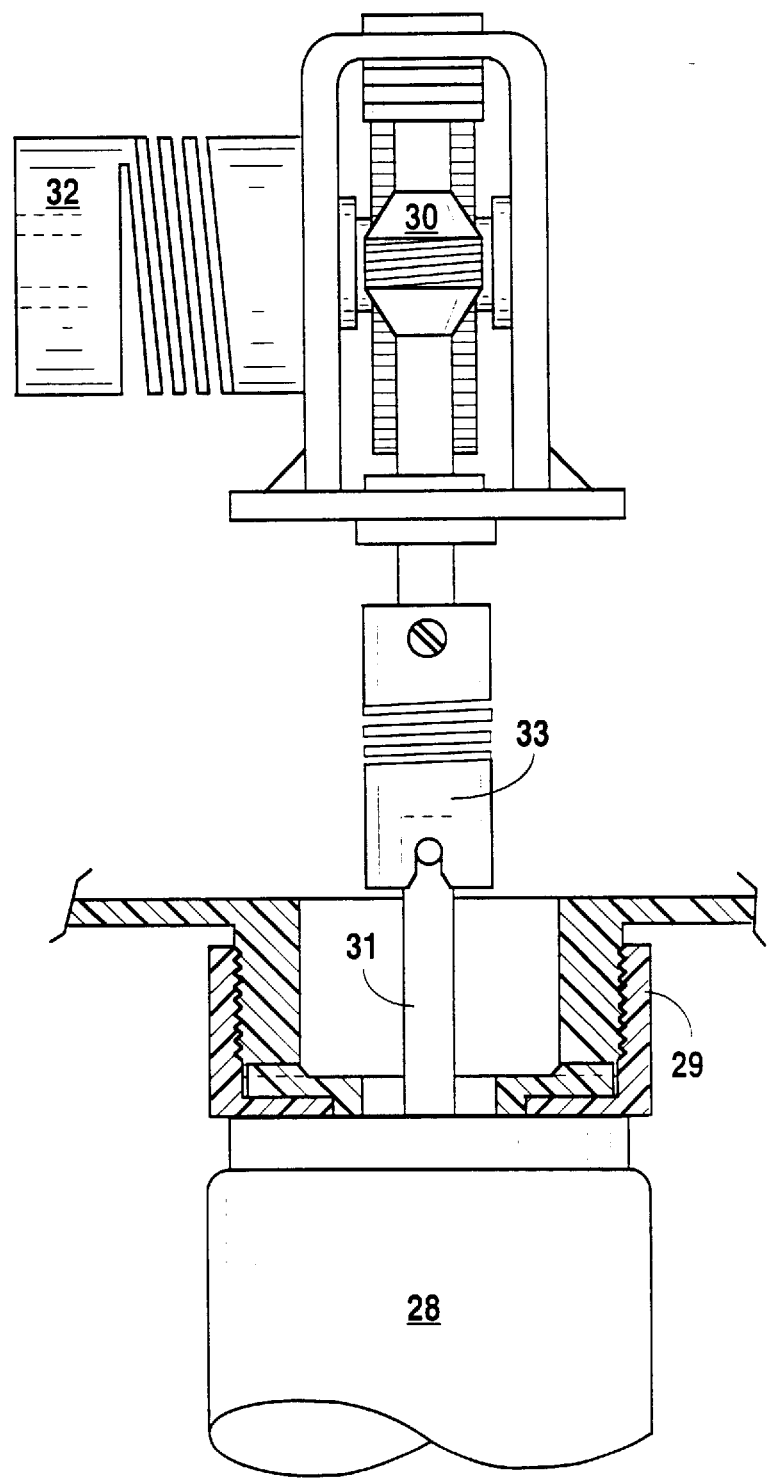
FIG. 5 is a partial cross-sectional view of FIG. 3.
Figure 6:
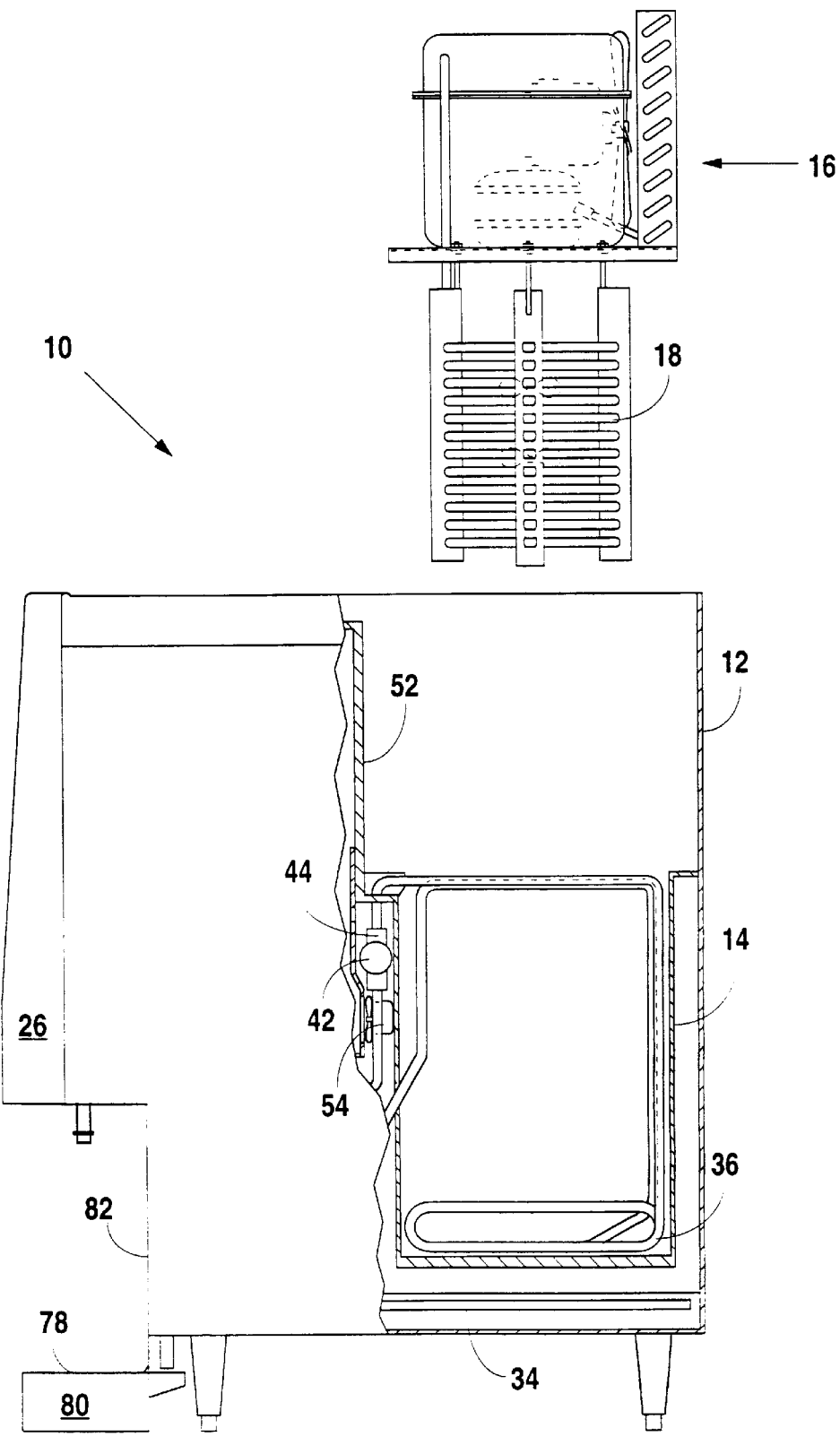
FIG. 6 is a partly cross-sectional, side elevation view of the dispenser of FIG. 1.
Figure 7:
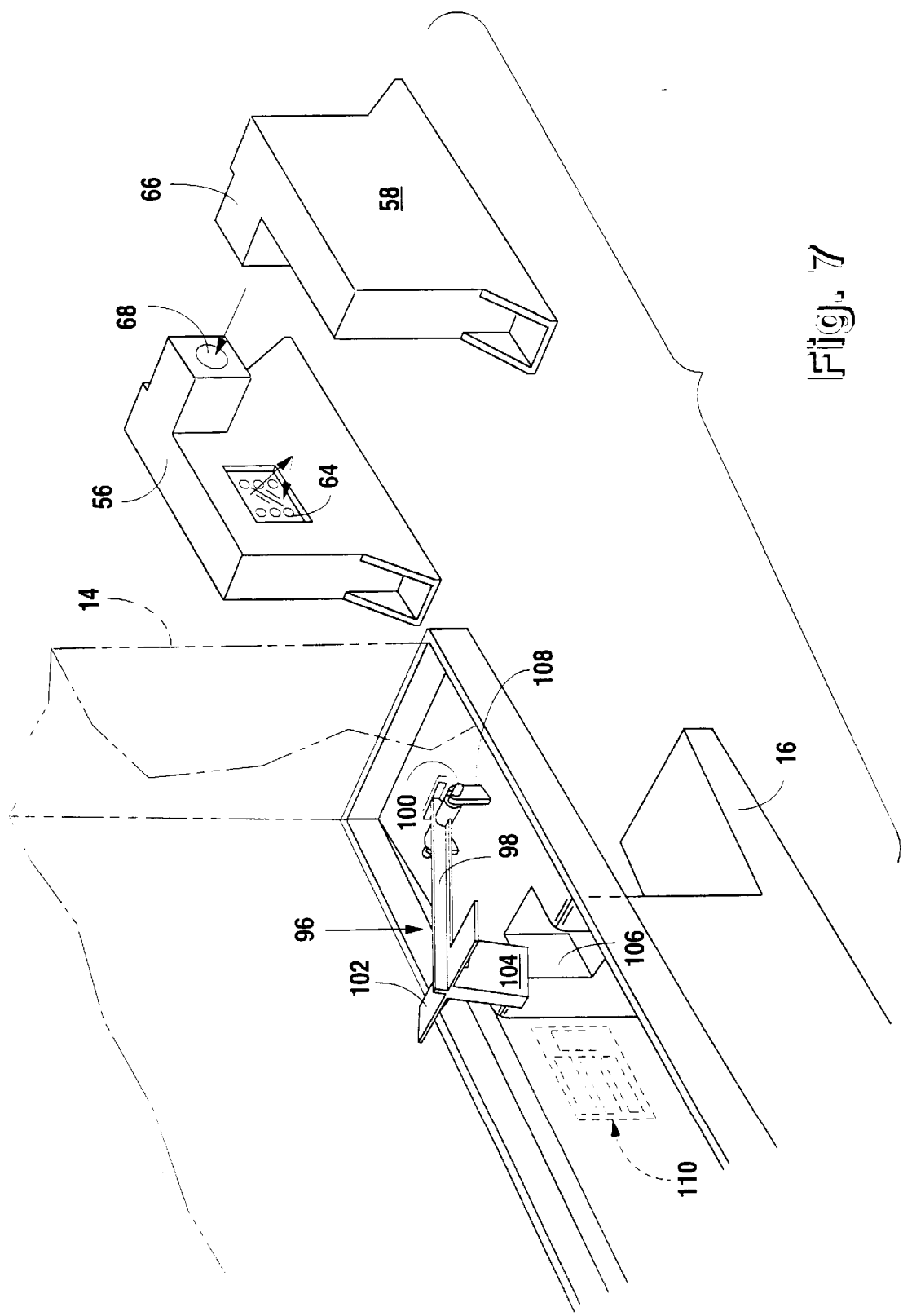
FIG. 7 is a partial, perspective view of the package flag and the level reader and I.D. reader.

One aspect of this invention is the fact that the motors 28 can be easily removed and replaced when needed, and without the use of tools. As shown in FIG. 5, the coupling 29 mounted on the motor is simply rotated by hand as the shaft 31 seats itself in the groove in driven coupling member 33. Access to the motors 28 is obtained by simply removing the splash plate 82.

The dispenser 10 includes four push buttons 73, 74, 75 and 76 on the front wall, two on each door 24 and 26, to initiate dispensing. These can be simple pour buttons, paddle type lever arms, portion control, or the start button for ultrasonic automatic shut-off. A cup can be set on a cup rest 78 on top of a drip tray 80 in front of a splash plate 82. When the dispenser 10 is arranged for dispensing into carafes, that is, when the cup rest is lowered, one or more separate cup supports 84 can be provided that slide on cup rest 78 for supporting cups more closely under the nozzle.

The packages 22 are preferably of a size to hold about five (5) liters of juice concentrate. Orange juice is preferably dispensed at a ratio of 5:1 water to concentrate. The dispenser 10 can dispense from a wide range of ratios such as from 3–12 or more. The preferred flow rate for dispensing beverage is three (3) ounces per second, although this can be varied also. The refrigeration system will make about 28 pounds of ice in the ice bank.

Figure 8:
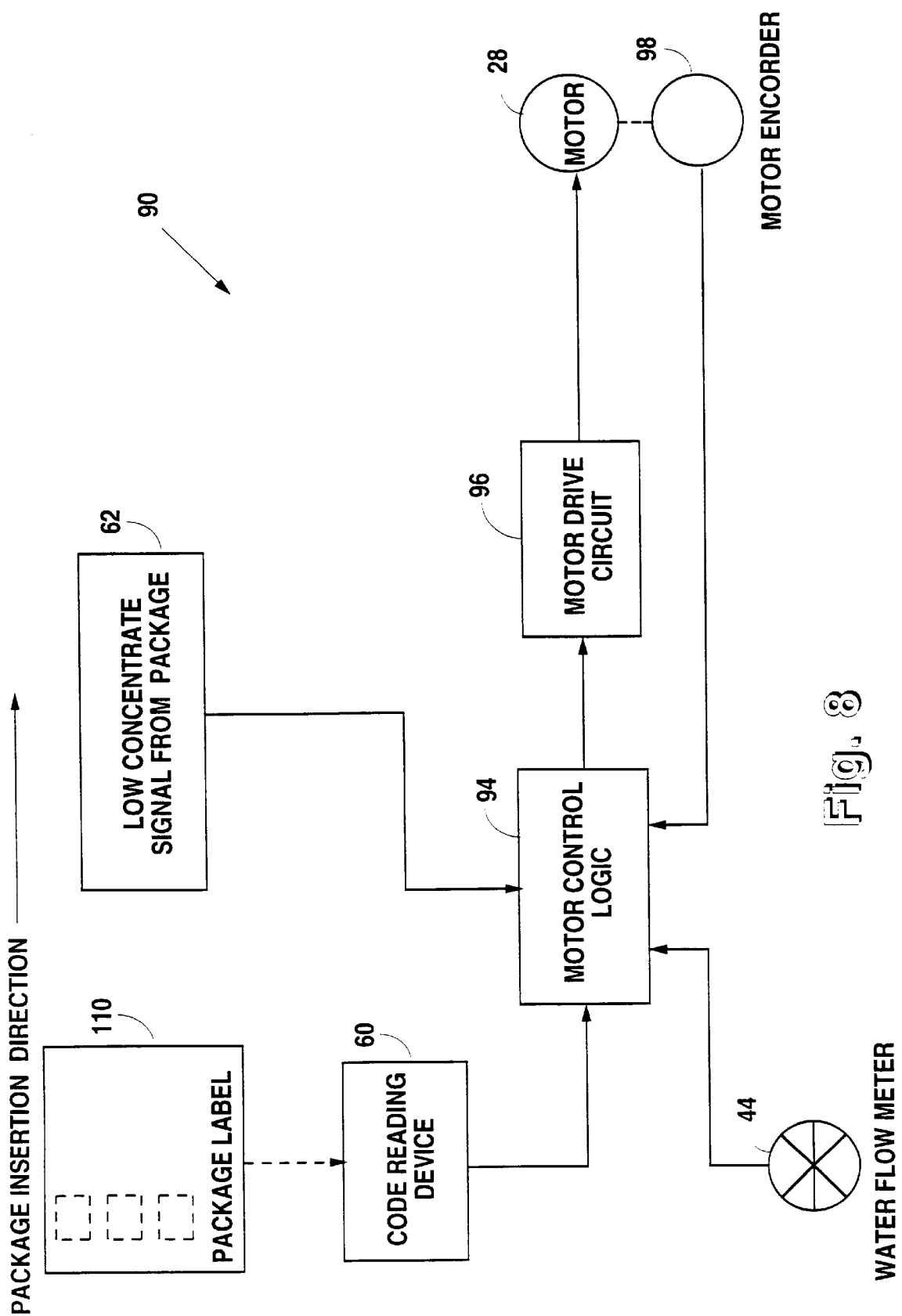
FIG. 8 is an electrical schematic of the electronic control circuit.
Figure 11:
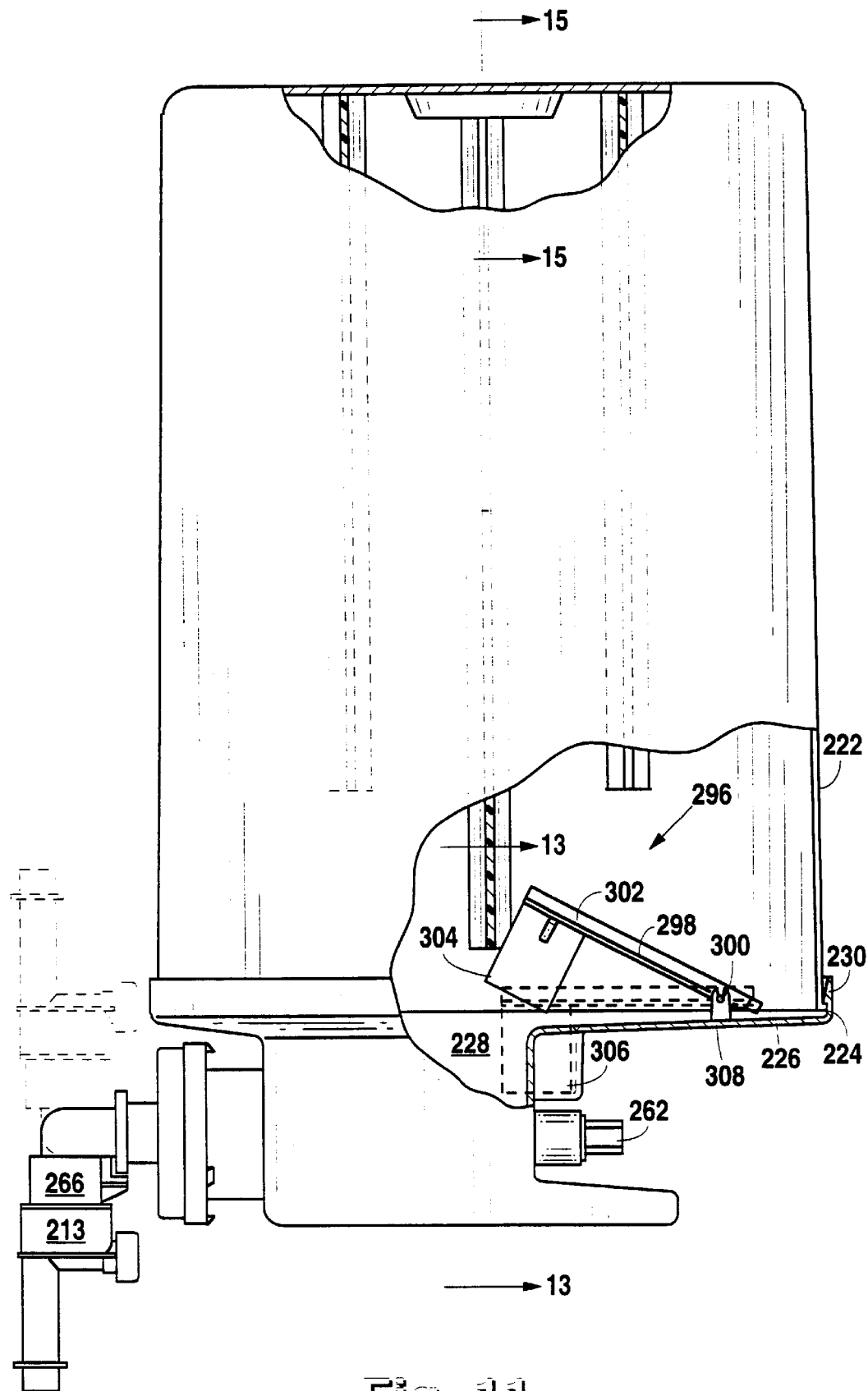
FIG. 11 is a partly cross-sectional, right side elevation view of the package of FIG. 9.
Figure 12:
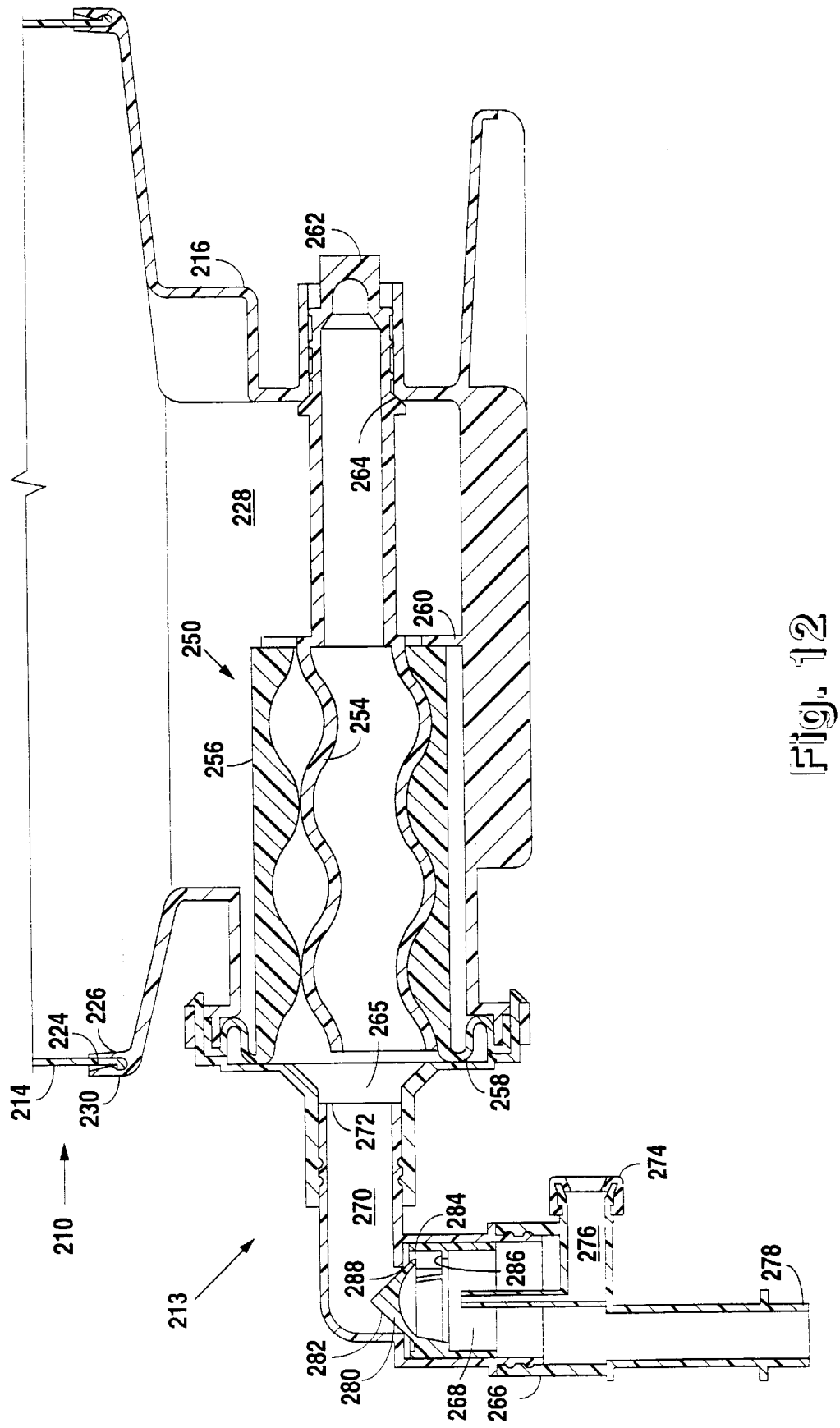
FIG. 12 is a cross-sectional view taken along line 12—12 of FIG. 10 through the lower portion of the package, including the pump and mixing nozzle.
Figure 13:
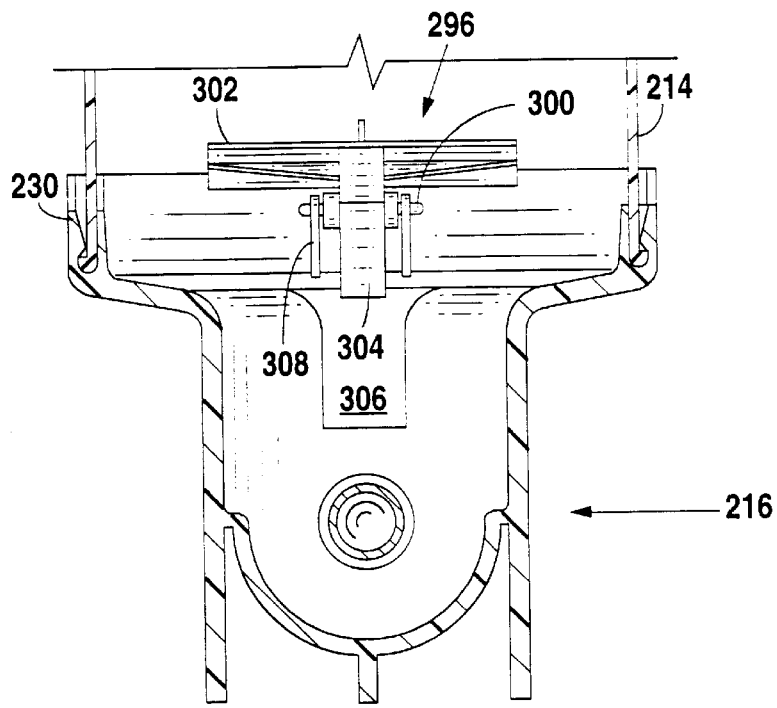
FIG. 13 is a cross-sectional view taken along line 13—13 of FIG. 11 and showing the float.

With reference now to FIG. 8, the electronic control system 90 will now be described with reference to the features of package loading, ratio recognition, and sold out.

Regarding package loading, the control system 90 includes a code reading device 92, a motor control logic circuit 94, and a motor control drive circuit 96. The package label 110 is preferably a highly reflective foil base material with highly absorbent black printing. The code reading device 92 is a single column of three infrared emitter/detector devices. When the package 22 is not in the dispenser 10, the code reading device 92 receives an all off signal. This resets the motor control logic circuit 94. When the package is inserted, the leading edge, being reflective foil, generates an all on signal. This condition signals the motor control logic to run the respective motor 28 at low voltage to engage the coupling 32 to the pump shaft 62 in the package. The next section of the label has a series of three vertical boxes that are selectively printed using absorbent black. As the package continues to its final position, the black area(s) of the label give at least one off signal to the motor logic. Any combination of off signals causes the motor to run one second more, then stop.

Regarding ratio recognition, the combination of printed black boxes or blank reflective areas of the label 110 in a single column of three rows gives six combinations, in addition to the all off or all on used for package loading. This information is used by the motor control logic circuit 94 to establish a ratio between the motor encoder 72 wheel pulses and the flow meter 44 pulses as a function of the dilution ratio of the product in the package. The motor control logic checks the time it takes for the water flow meter to produce a certain number of counts. It also checks the motor encoder counts the same way. It then divides the two numbers to establish a ratio and compares this to the ratio that was assigned to the particular combination of responses from the code reading device. If the number indicates that the dilution ratio is wrong, the motor logic either increases or decreases the pulse width of the motor drive circuit. This process repeats continuously. The encoder wheel of the motor also updates the motor control logic to assure that the motor maintains the speed that it was assigned by the motor control logic.

Regarding sold-out, the infrared emitter/detector 62 puts a beam across a section of the package. Mounted to the bottom of the package is the float 96. When the level of the package drops to near the bottom, the flag 10 on the float interrupts the beam. The condition is sent to the motor control logic which starts the L.E.D. light 70 blinking on the front membrane switch of the appropriate package, indicating a low level in that package. It also starts a counter that is monitoring the specific motor encoder 98. After a preset number of counts, the fluid level in the package is assumed to be exhausted, and the motor control logic turns off the motor drive circuit.

Another embodiment will now be described with reference to FIGS. 19–25. FIGS. 19–25 show a beverage dispenser 400 according one embodiment of the invention. The dispenser 400 pressurizes the container to about 10–12 psig.

The dispenser 400 might require some minimal conditioning of a concentrate package taken from a freezer before dispensing from it.

The beverage dispenser 400 includes a housing 402, a compartment 404 for receiving a one-piece, unitary, disposable, concentrate container pump package 406, an air drive assembly 408 for pressurizing the concentrate container 410 portion of the package 406, a pump drive means 412 adjacent the portion of the compartment 404 that receives the pump 414 portion of the package 406, a water line 416 for connection to a disposable mixing nozzle 418 connected to the pump 414, and a refrigeration system 420.

The dispenser 400 is a plastic and stainless steel unit with curved corners and a lighted, curved front panel or door 422 with a removable lens 424 to change the graphics in front of a low heat fluorescent light 426. The door 422 opens vertically about a hinge 428 to provide access to a service panel 430 having a load/unload button 432 and to provide access to the compartment 404; preferably there are two such compartments 404 side-by-side; because they are identical, only one is shown.

Figure 24:
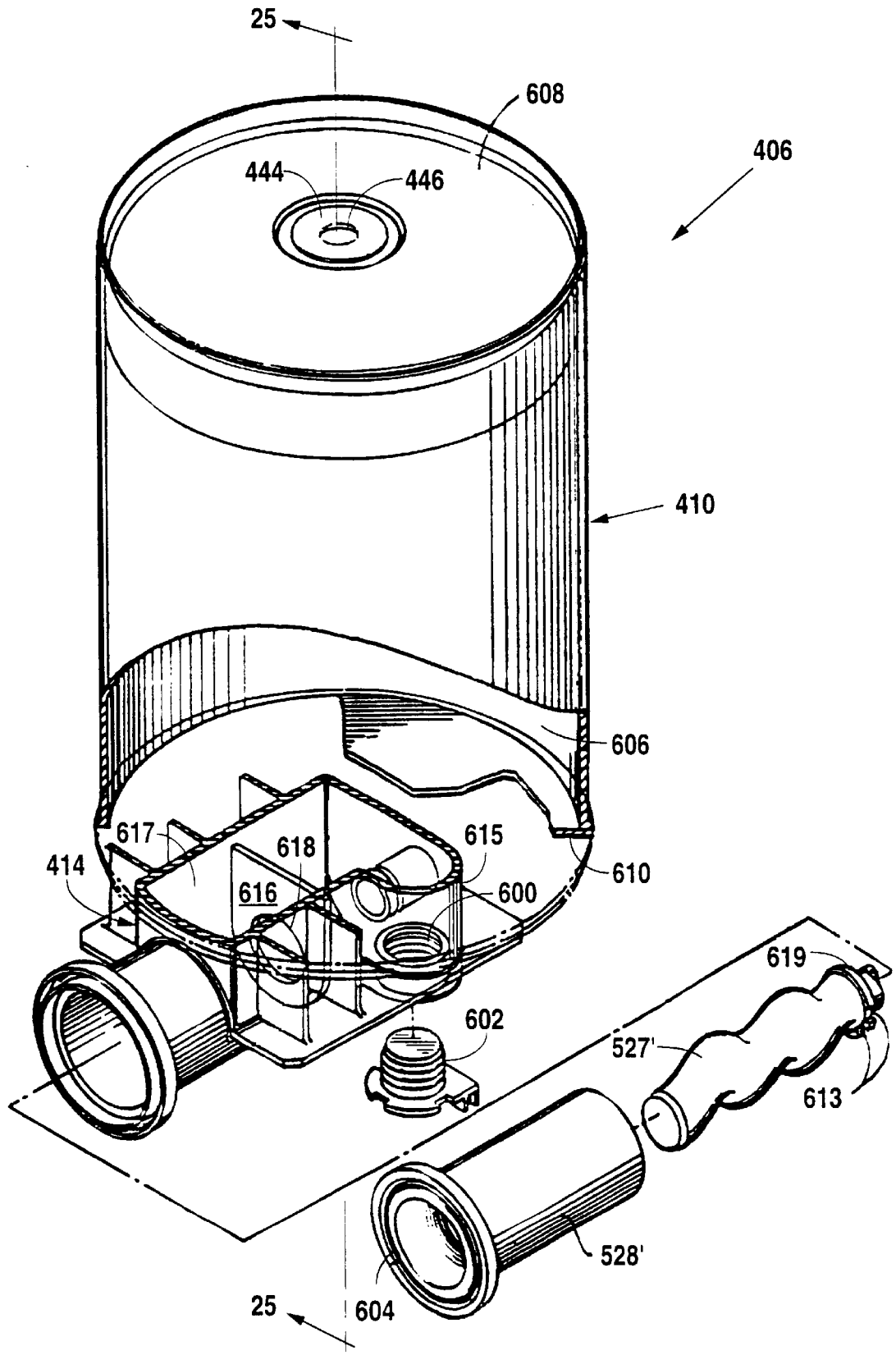
FIG. 24 is a partly broken-away perspective view of the one-piece, unitary package of this invention.
Figure 25:
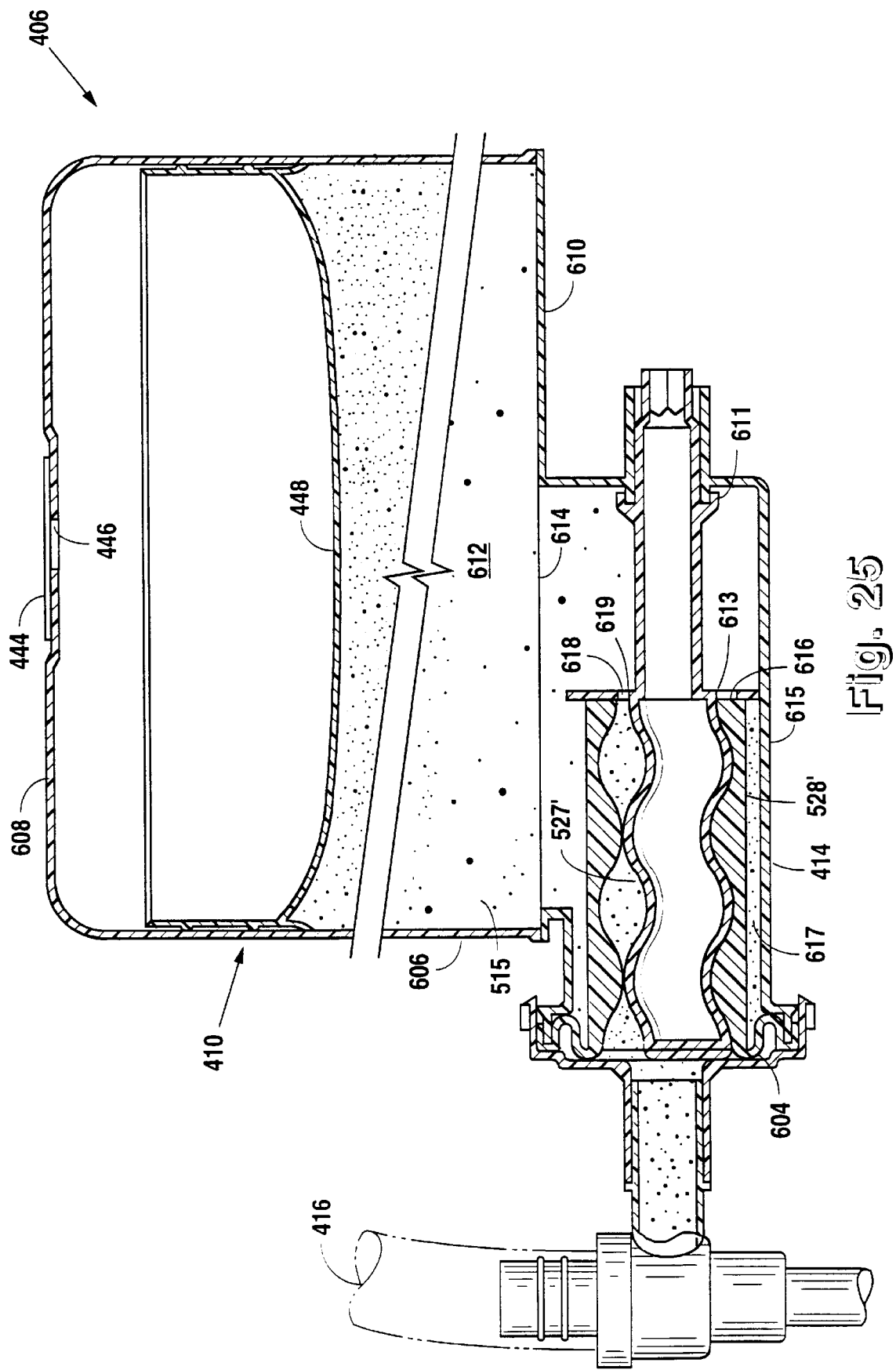
FIG. 25 is a cross-sectional view taken along line 25—25 of FIG. 24.

The one-piece integral concentrate container-pump package 406 preferably will come two to a case and the separate mixing nozzle 418 is then snapped to the package. The package is shown in FIGS. 24 and 25.

The rear wall of the compartment 404 is a wall of the refrigeration system's ice bank tank 434 in which the water is kept at 34° F. to control the temperature of the concentrate and to cool the incoming water, via water cooling coils 436. The package 406 is slid into the compartment 404 and alignment lugs 438 on the pump 414 align the pump with the pump motor.

The package 406 has indicator means thereon, and the dispenser 400 has means for automatically reading the indicator means and then automatically setting the pump motor speed in response to the type of product (concentrate) in the package 406 (different products require different ratios of concentrate to water and thus different pumping speeds). This indicator means is preferably a plurality of lugs on the filler cap. The automatic reading and setting means can be any such known means, for example, it can mechanically sense the lugs and then electrically set the pump speed to one of several predetermined speeds. The water flow rate is preferably fixed. The dispenser 400 also recognizes if no package is present, so as to inactivate the air drive. After inserting the package, the operator presses the load/unload button 432 which operates the air drive system 408 described below. This system locks the package 406 in place and punctures a label 444 over a hole 446 in the top wall of the package 406 above the package piston 448, with a tube 450 to pressurize the concentrate. The air drive system 408 also seals around the tube 450. The package remains pressurized until the load/unload button 432 is pushed, to vent the package and shut off the air. The air pressure is at about 50 psi in an accumulator tank but regulated to no more than 10–12 psi in the container 410. The regulator is not accessible to the store operator.

The water line 416 connected to the mixing nozzle 418 is regulated down to about 40 psi and includes a quick-disconnect with shut-off and a regulator washer.

The dispenser 400 can have either a push and hold dispense button 452 or an automatic fill system, such as an ultrasonic system.

The dispenser 400 provides accurate metering regardless of viscosity variations at or near freezer temperatures and with no or minimal conditioning (brief heating) of the package 406 after removal from the freezer, depending on the freezer temperature and the product.

Figure 19:
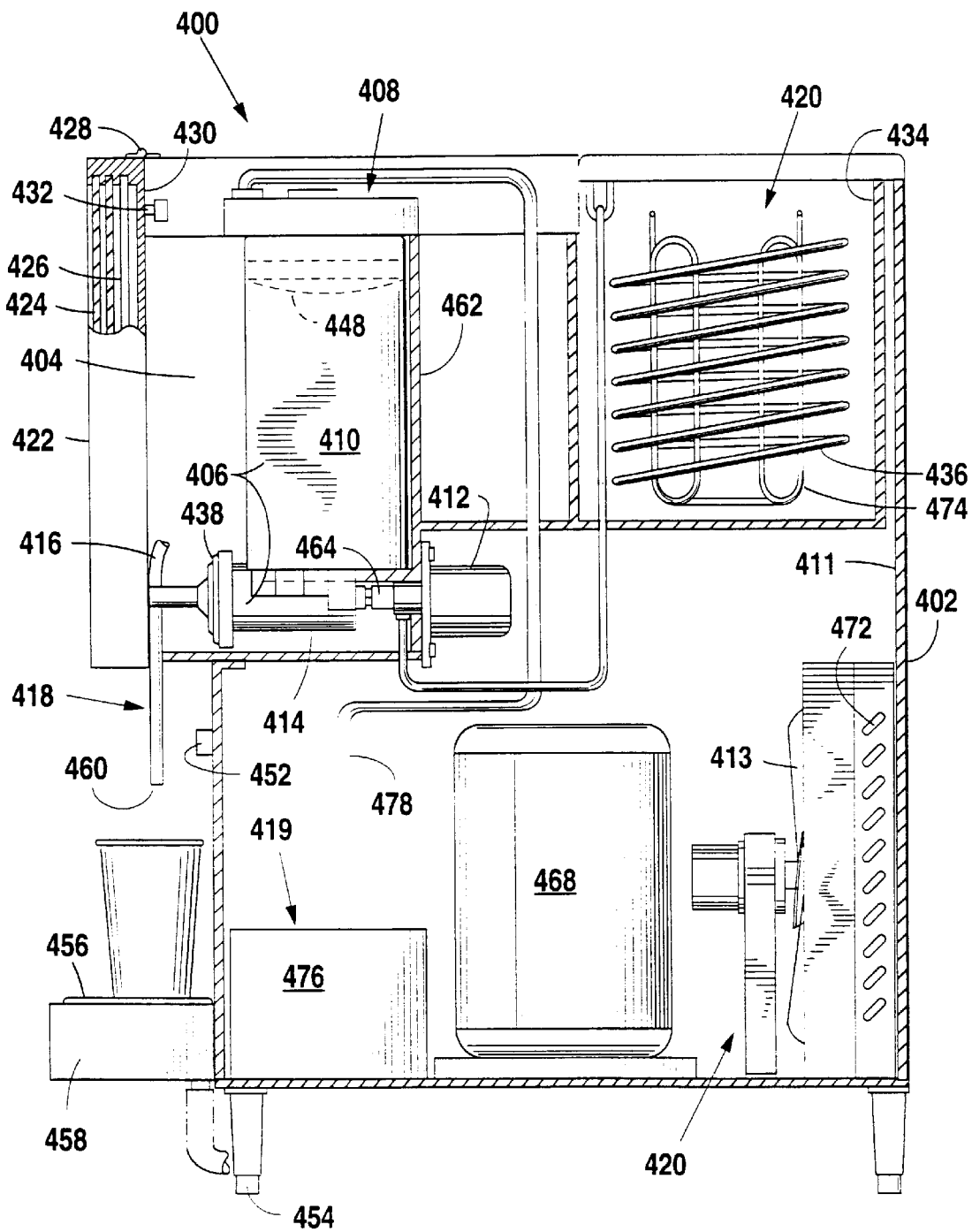
FIG. 19 is a partly cross-sectional, side view of another embodiment of a dispenser according to this invention.

Referring now in more detail to FIGS. 19–25 of the drawings, the dispenser 400 includes the housing 402 on legs 454, a cup support 456, a drip tray 458, and a pair of dispensing nozzles 460 (only one of which is shown in FIG. 19). The dispenser 400 is preferably a two-flavor dispenser (that is, it holds two separate disposable packages 406).

The compartments 404 each have a rear wall 462 which is semi-cylindrical and is a wall of the refrigeration tank 434. The pump drive means 412 is preferably a variable speed electric motor with a coupling 464 to receive a drive shaft 466 of the pump 414. The refrigeration system 420 includes the tank 434 for holding an ice water bath, a compressor 468, a fan 413, a condenser 472 and evaporator coils 474.

The air drive system 408 includes a compressed air source 476 including an air compressor, a motor, pressure regulators, a pressure vessel and air line 478. One embodiment of the air drive system is shown in FIGS. 20A, 20B and 20C.

Figure 20A:
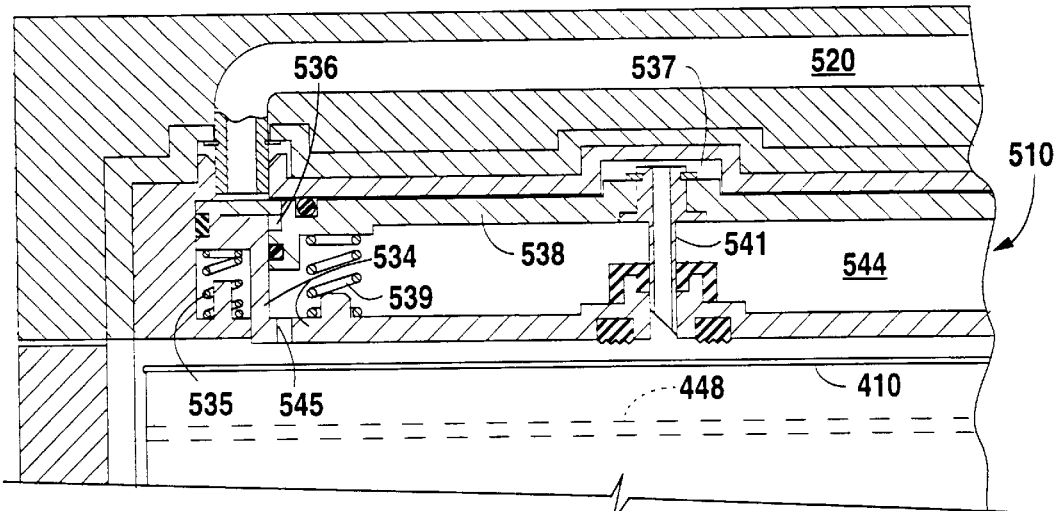
FIGS. 20A, 20B and 20C are cross-sectional side views of an air drive assembly in its unpressurized, partially pressurized, and fully pressurized operating positions.
Figure 20B:
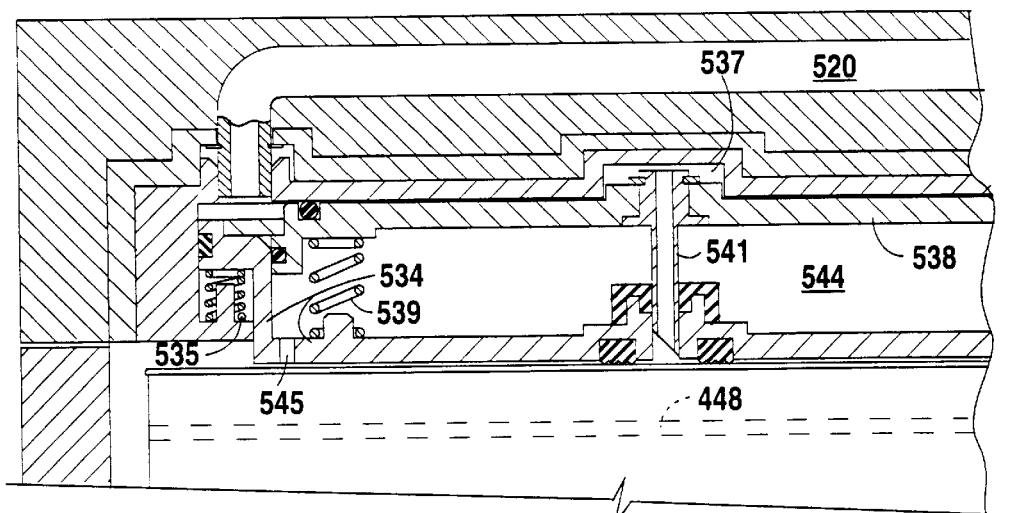
Figure 20C:
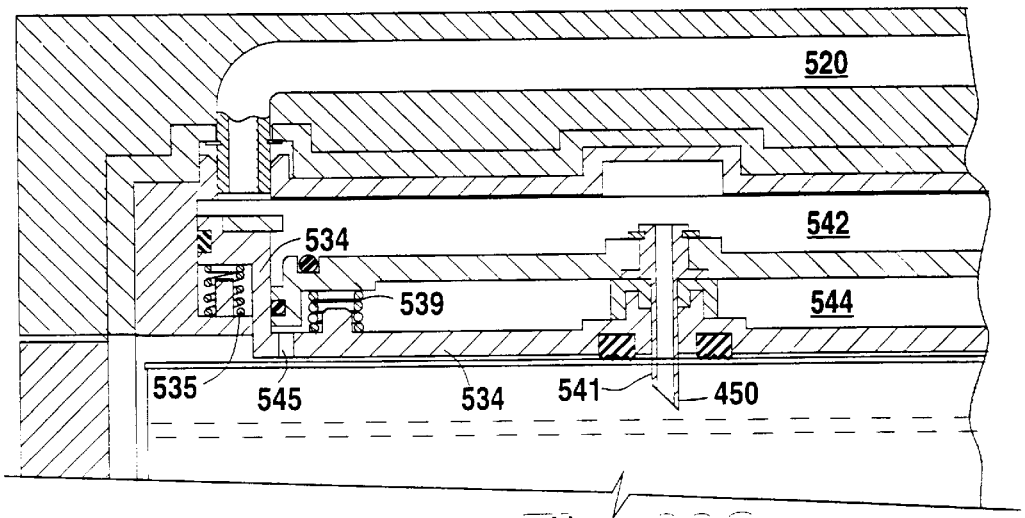

FIGS. 20A–20C show one air drive assembly 510 used to pressurize the inside of the container 410 and drive the piston 448 to force concentrate into the pump 414. Of course, it will be understood that it can be used in a system not requiring a piston. The air drive assembly 510 receives compressed air from the compressed air source 476 via compressed air line 478. When a new package 406 is placed into the compartment 404, compressed air is delivered to the top of spring assembly 534 which is movably connected to spring 535. As the pressure is increased, spring 535 compresses which lowers spring assembly 534 until its inner edge resides in cavity 536 and its plate portion rests upon the top of container 410, as shown in FIG. 12B. That motion opens the small passageway into cavity 537 (see FIG. 20B). As a result of the air pressure, plate 538 then begins a downward movement compressing spring 539. As the air pressure increases above plate 538, its downward movement forces the air contained in cavity 544 through outlet 545, thereby reducing the resistive pressure to that downward movement. The air pressure increases such that plate 538 compresses spring 539 and moves downward with enough force such that hollow punch 541 punctures container 410, releasing the compressed air into container 410. During regular dispensing operation, the air pressure on top plate 538 is kept at the appropriate level to keep springs 535 and 539 completely compressed, thus creating cavity 542. In addition, the inside of container 410 above piston 448 is pressurized through its exposure to cavity 542 via the hollow opening of punch 541. The pressure maintained in cavity 542 and, subsequently, above the piston 448 is kept sufficiently high to provide constant pressure against the product by the piston causing the product (or concentrate) to be forced into the pump 414 on demand.

Although this embodiment uses a compressed air assembly, a collapsible bag type container could be used or the piston drive could be pressurized through another means such as a mechanical one.

After the container 410 is inserted into compartment 404 and pressurized, it delivers the product to the progressive cavity pump 521 via feed tube 522. Progressive cavity pump 521 is driven by motor 523, and its operation will be discussed herein with reference to FIGS. 21–23. In this embodiment, water from cooling coils 436 is delivered to water block 524 via conduit. 525. The delivered water is mixed with the product delivered by the pump 521 from the container 410 into mixing chamber 532. In addition, before the final product is dispensed, it is further mixed by static mixer 526.

Figure 21:
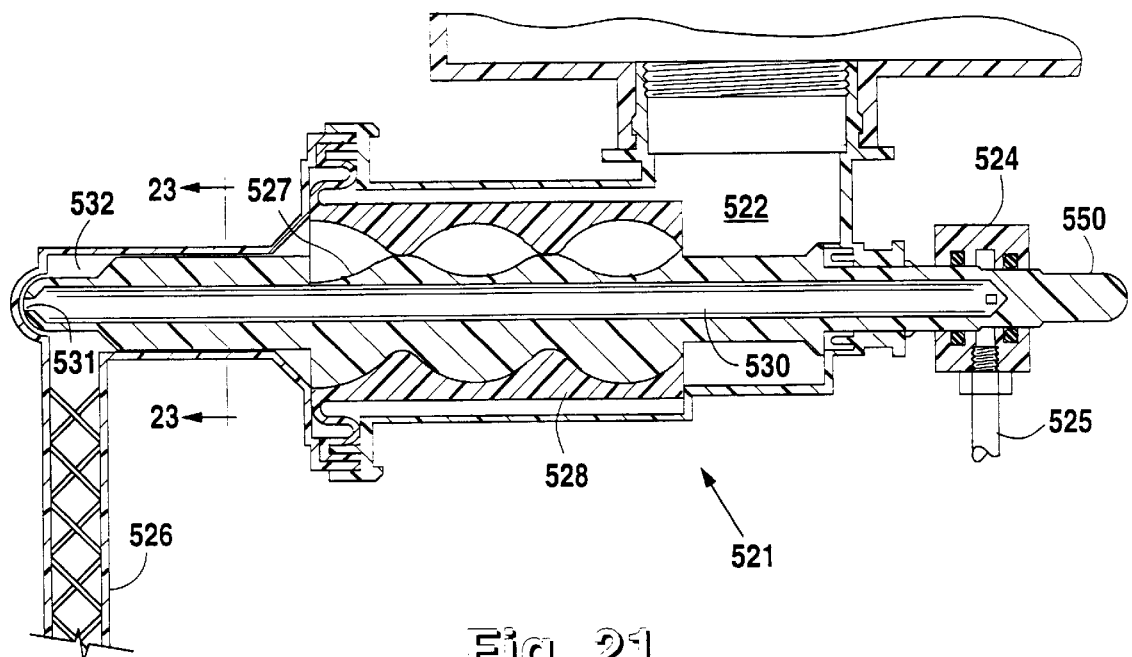
FIG. 21 is a cross-sectional side view of a progressive cavity pump which can be permanently mounted in the dispenser of FIG. 19.
Figure 23:
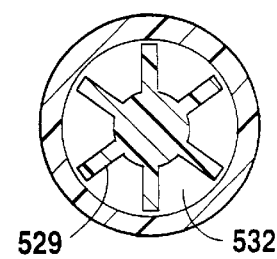
FIG. 23 is a section view taken along lines 23—23 of FIG. 21.

Referring to FIGS. 21 and 23, the operation of progressive cavity pump 521 in regard to a first embodiment of the present invention will be discussed. In operation, product is fed into the pump 521 via feed tube 522 where it is pumped to mixing chamber 532 through the progressive cavities formed as rotor 527 rotates within stator 528. Rotor 527 is further provided with vanes 529 (see FIG. 23) which extend beyond the pump cavity into mixing chamber 532. The purpose of vanes 529 is to break up the pumped product into several segments which reduces the back pressure on the stator and in the mixing chamber so that it will readily mix with the water. The water to be mixed with the product is delivered to water block 524 via water conduit 525 where it enters into passageway 530. Passageway 530 extends completely through rotor 527 and opens into mixing chamber 532 via opening 531. As the water enters mixing chamber 532 through opening 531, it is deflected rearwardly into mixing chamber 532 where it dislodges product from vanes 529 and mixes with that product as it is forced from pump 521. The water and product then passes through static mixer 526 for a final mix on its way to a cup.

Figure 22:
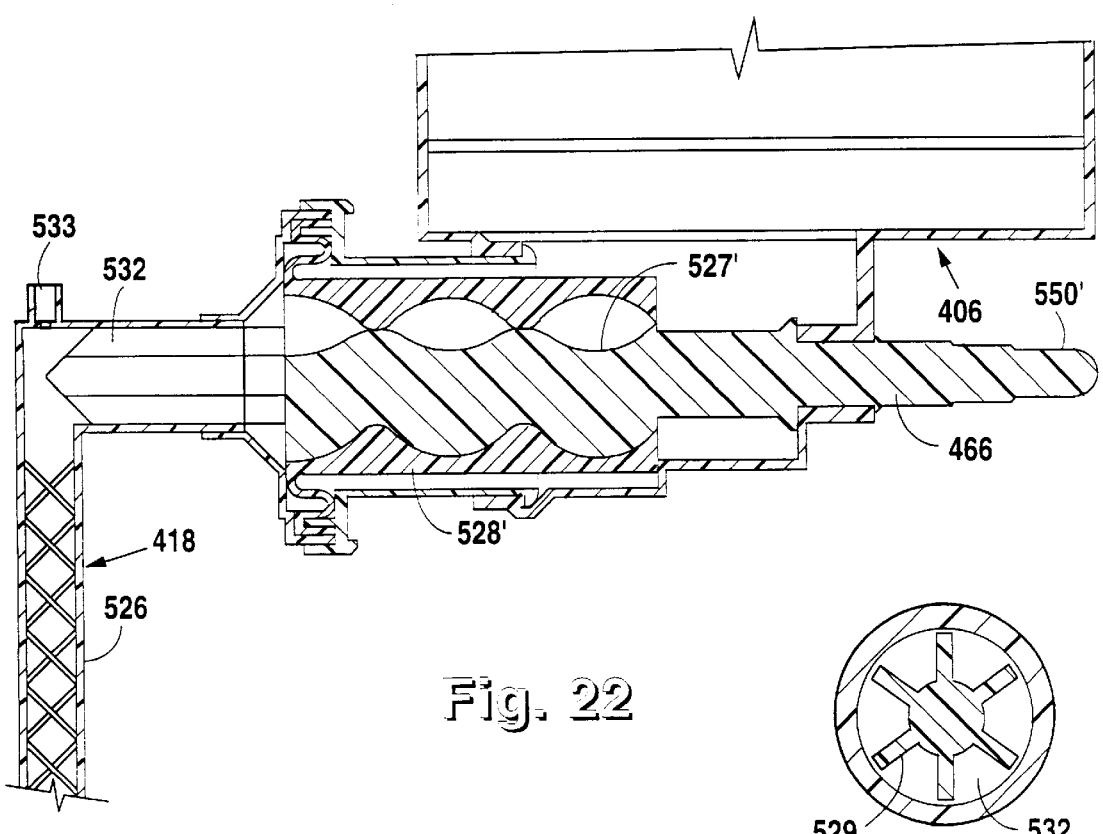
FIG. 22 is a cross-sectional side view of a disposable concentrate container and progressive cavity pump integral therewith that can be used in the dispenser of FIG. 19.

Referring to FIG. 22, a second embodiment will be described. In this embodiment, the pump housing is integral with the container 410 making it a single unit. It is intended that the entire unit (package 406 plus mixing nozzle 418) be disposable. Of course, the container 410 may be of any desired type known in the art and which is suitable for use with the progressive cavity pump; however, the embodiment disclosed herein is a piston type container. In addition, the water is injected directly into mixing chamber 532 via inlet 533 to produce the final mixed product. In operation, the container and pump package 406 is placed into the compartment 404 such that the pump 414 is rotatably connected to the motor 412 via rotor shaft connector or bendix drive 550. The pump and dispensing unit of this embodiment operate in a similar manner as previously described with reference to FIG. 21. The movement of the pump when turned on, including the movement of the stator, assists in heating the concentrate and making the concentrate more pliable since it is in contact with concentrate at the area where the concentrate feeds into the pumps inlet. As known in progressive cavity pumps, one of the two elements of the rotor and stator is a single lead screw and the other is a double lead screw, and the rotor drive shaft is off center. In the preferred embodiment, the rotor is made of high density polyethylene and the stator of rubberized polyolefin.

FIGS. 24 and 25 show a one-piece, unitary package 406 of the present invention including the concentrate container 410 and the pump 414. The container 410 has a cylindrical side wall 606, a top wall 608, a bottom wall 610, a concentrate chamber 612, and a concentrate outlet opening 614. The container 410 preferably has a hole 446 in the top wall 608 thereof covered by a label 444 which is pierced by the punch or air tube 450. The container 410 also has a piston 448 which is forced down by the air pressure and pushes the concentrate 515 into the pump 414. The hole 446 is not essential because the air tube could alternatively pierce the top wall. The pump 414 includes a housing 615 having an intermediate wall 616 to define the stator chamber 617. The stator 528' abuts the wall 616. The wall 616 has an opening 618 which is a bearing for the ring 619 of the rotor 527'. The ring 619 has openings or serrations 613 in its periphery which are the concentrate inlet openings to the pump. The rotor shaft includes a labyrinth seal 611 where it rotatably extends through the housing 615.

The container 410 is preferably injection molded of polyethylene with a wall thickness of about 0.060 inch. The container 410 is preferably hot plate welded to the pump 414, which is also injection molded of polyethylene. While other types of pumps could be used in this package, the pump is preferably a positive displacement pump and preferably a rotary positive displacement pump (in contrast to a reciprocating pump) and most preferably a progressive cavity pump.

The package 406 is preferably oriented upside-down during shipping. The container 410 is filled through a fill opening 600 adjacent the pump. A fill opening cap 602 seals the opening 600 after filling. The stator 528' can move or flex sideways during pumping by virtue of the flexible seal 604; this avoids the need for an expensive constant velocity joint to the pump.

The mixing nozzle 418 is attached to the pump 414 either before or after inserting the package 406 into the dispenser 400. After insertion and attachment of the mixing nozzle, the water line 416 is connected to the mixing nozzle.

An important feature of this invention is that the package and air drive stuff the pump. That is, the concentrate is in flow communication with the pump inlet and is under pressure. This cannot be done with some pumps, such as flexible vane pumps, because the concentrate would be forced right through the pump.

One embodiment of this invention allows dispensing of a concentrate at or near freezer temperatures with no or minimal conditioning (warming). This invention allows dispensing at or above the ice point (and in some cases below the ice point) and provides a product with an ice point at or close to freezer temperatures. The ice point is the temperature at which crystals of ice begin to form. The prior art teaches that the concentrate must be at least 35°–45° F. This invention can dispense at 5° F. for all products (except grapefruit, which must be at about 10° F.). The ice point differs for different products. Also, freezer temperature differs for different freezers, varying from about −25° F. to 10° F. The ice point for 5+1 orange juice (58.5 Brix) is about 0° F. and for 3+1 orange juice (41.8 Brix) is about 17.5° F. This invention includes providing a product which has an ice point at or near freezer temperatures. If the ice point for a product is 0° F., and the freezer temperature is −5° F., then a little, quick, warming would be used (for example, by immersing in hot water for a short time or placing in a microwave). This is what is meant by "little or no conditioning" in contrast to the prior art practice of placing in a refrigerator for two to three days, to thaw to 35° F. to 40° F.

The concentrate should be high enough in ratio (e.g., 5+1) such that ice does not form at or near freezer temperatures.

The prior art dispensers require the viscosity of the concentrate to be below about 8000 centipoise. This embodiment of the present invention works even though the viscosity is much higher, such as 500,000 centipoise and often up to 13,000,000 centipoise.

While the preferred embodiment of this invention has been described above in detail, it is to be understood that variations and modifications can be made therein without departing from the spirit and scope of the present invention. For example, the dispenser 10 can be designed for any number of packages such as 2, 4, 6, etc.

What is claimed is:

1. A postmix juice dispenser comprising:
   (a) a dispenser housing;
   (b) an ice-water bath tank in said housing;
   (c) a refrigeration system in said housing including an evaporator coil located in said tank;

(d) a package chamber for receiving and holding a plurality of separate juice concentrate packages, one in each of a plurality of separate package stations;

(e) a door for providing access to said chamber for inserting into and/or removing concentrate packages from said chamber;

(f) a plurality of separate concentrate pump drive motors mounted in said housing;

(g) a plurality of separate drive shaft couplings, one connected to each of said motors, and mounted one in each of said package stations;

(h) a water line in said housing including a water inlet line connected to a water cooling coil located in said ice-water bath tank, connected in turn to a separate water connection tube for each of said stations, each of said tubes terminating in a nipple located one in each of said stations;

(i) a solenoid valve and a flow meter located one in each of said water connection tubes;

(j) control means responsive to signals from each one of said flow meters for controlling the speed of the respective one of said motors, to provide the desired ratio of water to concentrate;

(k) means, in heat exchange relationship with said ice-water bath tank, for cooling said chamber; and (l) means, in said housing, for automatically identifying the water to concentrate mixing ratio of the juice contained in a package inserted into any of said package stations.

2. The dispenser as recited in claim 1 including a disposable juice concentrate package inserted into said chamber, said package including a built-in progressive cavity pump and a mixing nozzle.

3. The dispenser as recited in claim 2 wherein said package includes a product I.D. label and said automatic identifying means includes a product I.D. label reader mounted in said chamber.

4. The dispenser as recited in claim 3 wherein said label includes a reflective surface with one or more non-reflective lines.

5. The dispenser as recited in claim 3 wherein said package includes a pump drive shaft extending exteriorily of said package and wherein said dispenser includes means for sensing said label as a package is inserted into said chamber and for energizing said motor to turn said drive shaft coupling at a slow speed to engage it with said drive shaft.

6. The dispenser as recited in claim 3 wherein said control means includes means for reading said product I.D. label and for controlling the speed of the respective motor in response both to said I.D. label and to said flow meter signals to provide the desired ratio of concentrate to water.

7. The dispenser as recited in claim 2 wherein said package includes a low liquid level indicator, and said dispenser includes means for reading said indicator.

8. The dispenser as recited in claim 7 wherein said indicator is a float and said reading means includes an infrared transmitter and receiver.

9. The dispenser as recited in claim 2 wherein said package includes a water inlet mating with said nipple in a respective station.

10. The dispenser as recited in claim 1 wherein each of said motors is connected to said respective drive shaft coupling through a 90° gear and said motor are oriented vertically and below said respective package station.

11. The dispenser as recited in claim 1 wherein said tank is aluminum and said heat exchange means includes an aluminum wall in said chamber in contact with said aluminum tank.

12. The dispenser as recited in claim 11 including a fan for circulating air in said chamber.

13. The dispenser as recited in claim 1 including an infrared transmitter and receivor in each of said stations for reading the liquid level in a package in each respective station.

14. The dispenser as recited in claim 13 wherein said automatic identifying means includes a light transmitter and receiver in each station in addition to said infrared transmitter and receiver, for reading label information on a package in a respective station.

15. The dispenser as recited in claim 1 wherein said automatic identifying means includes a light transmitter and receiver in each station for reading information on a package in a respective station.

* * * * *